US008346884B2

(12) United States Patent
Pettey

(10) Patent No.: US 8,346,884 B2
(45) Date of Patent: *Jan. 1, 2013

(54) METHOD AND APPARATUS FOR A SHARED I/O NETWORK INTERFACE CONTROLLER

(75) Inventor: Christopher J. Pettey, Cedar Park, TX (US)

(73) Assignee: Nextio Inc., Austin, TX (US)

( * ) Notice: Subject to any disclaimer, the term of this patent is extended or adjusted under 35 U.S.C. 154(b) by 1963 days.

This patent is subject to a terminal disclaimer.

(21) Appl. No.: 10/909,254

(22) Filed: Jul. 30, 2004

(65) Prior Publication Data

US 2005/0053060 A1 Mar. 10, 2005

Related U.S. Application Data

(63) Continuation-in-part of application No. 10/864,766, filed on Jun. 9, 2004, now Pat. No. 7,664,909, and a continuation-in-part of application No. 10/827,622, filed on Apr. 19, 2004, now Pat. No. 7,219,183, and a continuation-in-part of application No. 10/827,620, filed on Apr. 19, 2004, now Pat. No. 8,102,843, and a continuation-in-part of application No. 10/827,117, filed on Apr. 19, 2004, now Pat. No. 7,188,209, and a continuation-in-part of application No. 10/802,532, (Continued)

(51) Int. Cl.
| G06F 15/167 | (2006.01) |
| G06F 15/16 | (2006.01) |
| G06F 13/00 | (2006.01) |
| H04L 12/50 | (2006.01) |

(52) U.S. Cl. ........ 709/213; 709/238; 709/249; 710/316; 710/317; 370/351; 370/357; 370/382

(58) Field of Classification Search .................. 709/218, 709/244, 220, 229, 213–215, 223, 238, 248–250; 710/56, 308, 35, 316, 317; 711/118; 370/392, 370/463, 351, 357, 360, 381, 382

See application file for complete search history.

(56) References Cited

U.S. PATENT DOCUMENTS 4,058,672 A 11/1977 Crager et al.
(Continued)

FOREIGN PATENT DOCUMENTS

EP 0574691 A 12/1993
(Continued)

OTHER PUBLICATIONS

Dugan et al. "N Port ID Virtualization." Nov. 29, 2001. Document No. 01-627v0. IBM Corporation. http://www.t11.org.

(Continued)

Primary Examiner — Tae Kim
(74) Attorney, Agent, or Firm — James W. Huffman

(57) ABSTRACT

A shared network interface controller (NIC) interfaces a plurality of operating system domains as part of the load-store architecture of the operating system domains. A bus interface couples the NIC to a load-store domain bus (such as PCI-Express), using header information to associate data on the bus with an originating operating system domain. Transmit/receive logic connects the NIC to the network. Association logic allows the NIC to designate, and later lookup, which destination MAC address (on the Ethernet side) is associated with which operating system domain. Descriptor register files and Control Status Registers (CSR's) specific to an operating system domain are duplicated and made available for each domain. Several direct memory access (DMA) engines are provided to improve throughput. Packet replication logic, filters (perfect and hash) and VLAN tables are used for looping back packets originating from one operating system domains to another and other operations.

83 Claims, 15 Drawing Sheets

BLOCK DIAGRAM OF SHARED NETWORK INTERFACE CONTROLLER

Related U.S. Application Data filed on Mar. 16, 2004, now Pat. No. 7,836,211, and a continuation-in-part of application No. 10/757,714, filed on Jan. 14, 2004, now Pat. No. 7,046,668, and a continuation-in-part of application No. 10/757,713, filed on Jan. 14, 2004, now Pat. No. 7,457,906, and a continuation-in-part of application No. 10/757,711, filed on Jan. 14, 2004, now Pat. No. 7,103,064, said application No. 10/802,532 is a continuation-in-part of application No. 10/757,714, and a continuation-in-part of application No. 10/757,713, and a continuation-in-part of application No. 10/757,711, said application No. 10/864,766 is a continuation-in-part of application No. 10/757,714, and a continuation-in-part of application No.10/757,713, and a continuation-in-part of application No. 10/757,711, and a continuation-in-part of application No. 10/802,532, said application No. 10/827,622 is a continuation-in-part of application No. 10/802,532, said application No. 10/827,620 is a continuation-in-part of application No. 10/802,532, said application No. 10/827,117 is a continuation-in-part of application No. 10/802,532.

(60) Provisional application No. 60/515,558, filed on Oct. 29, 2003, provisional application No. 60/523,522, filed on Nov. 19, 2003, provisional application No. 60/541,673, filed on Feb. 4, 2004, provisional application No. 60/555,127, filed on Mar. 22, 2004, provisional application No. 60/575,005, filed on May 27, 2004, provisional application No. 60/588,941, filed on Jul. 19, 2004, provisional application No. 60/589,174, filed on Jul. 19, 2004, provisional application No. 60/491,314, filed on Jul. 30, 2003, provisional application No. 60/440,788, filed on Jan. 21, 2003, provisional application No. 60/440,789, filed on Jan. 21, 2003, provisional application No. 60/464,382, filed on Apr. 18, 2003.

(56) References Cited

U.S. PATENT DOCUMENTS

| | | | | |
|---|---|---|---|---|
| 5,280,614 | A | 1/1994 | Munroe et al. | |
| 5,414,851 | A | 5/1995 | Brice, Jr. et al. | |
| 5,581,709 | A | 12/1996 | Ito et al. | |
| 5,590,285 | A | 12/1996 | Krause et al. | |
| 5,590,301 | A | 12/1996 | Guenthner et al. | |
| 5,600,805 | A | 2/1997 | Fredericks et al. | |
| 5,623,666 | A | 4/1997 | Pike et al. | |
| 5,633,865 | A | 5/1997 | Short | |
| 5,758,125 | A | 5/1998 | Misinai et al. | |
| 5,761,669 | A | 6/1998 | Montague et al. | |
| 5,790,807 | A | 8/1998 | Fishler et al. | |
| 5,812,843 | A | 9/1998 | Yamazaki et al. | |
| 5,909,564 | A | 6/1999 | Alexander et al. | |
| 5,923,654 | A * | 7/1999 | Schnell | 370/390 |
| 5,926,833 | A | 7/1999 | Rasoulian et al. | |
| 6,009,275 | A | 12/1999 | DeKoning et al. | |
| 6,014,669 | A | 1/2000 | Slaughter et al. | |
| 6,044,465 | A | 3/2000 | Dutcher et al. | |
| 6,047,339 | A * | 4/2000 | Su et al. | 710/56 |
| 6,055,596 | A | 4/2000 | Cepulis | |
| 6,078,964 | A | 6/2000 | Ratcliff et al. | |
| 6,112,263 | A | 8/2000 | Futral | |
| 6,128,666 | A | 10/2000 | Muller et al. | |
| 6,141,707 | A | 10/2000 | Halligan et al. | |
| 6,167,052 | A | 12/2000 | McNeill et al. | |
| 6,170,025 | B1 | 1/2001 | Drottar et al. | |
| 6,222,846 | B1 | 4/2001 | Bonola et al. | |
| 6,240,467 | B1 | 5/2001 | Beardsley et al. | |
| 6,247,077 | B1 | 6/2001 | Muller et al. | |
| 6,343,324 | B1 | 1/2002 | Hubis et al. | |
| 6,421,711 | B1 | 7/2002 | Blumenau et al. | |
| 6,484,245 | B1 | 11/2002 | Sanada et al. | |
| 6,496,880 | B1 | 12/2002 | Ma et al. | |
| 6,507,896 | B2 | 1/2003 | Sanada et al. | |
| 6,510,496 | B1 | 1/2003 | Tarui et al. | |
| 6,523,096 | B2 | 2/2003 | Sanada et al. | |
| 6,535,964 | B2 | 3/2003 | Sanada et al. | |
| 6,542,919 | B1 | 4/2003 | Wendorf et al. | |
| 6,556,580 | B1 | 4/2003 | Wang et al. | |
| 6,571,360 | B1 * | 5/2003 | Drogichen et al. | 714/44 |
| 6,601,116 | B1 * | 7/2003 | Shemla et al. | 710/35 |
| 6,615,336 | B1 | 9/2003 | Chen et al. | |
| 6,622,153 | B1 | 9/2003 | Lee et al. | |
| 6,629,162 | B1 | 9/2003 | Arndt et al. | |
| 6,633,916 | B2 * | 10/2003 | Kauffman | 709/229 |
| 6,640,206 | B1 | 10/2003 | Callender et al. | |
| 6,662,254 | B1 | 12/2003 | Tal et al. | |
| 6,665,304 | B2 | 12/2003 | Beck et al. | |
| 6,678,269 | B1 | 1/2004 | Michels et al. | |
| 6,721,806 | B2 * | 4/2004 | Boyd et al. | 719/312 |
| 6,728,844 | B2 | 4/2004 | Sanada et al. | |
| 6,742,090 | B2 | 5/2004 | Sanada et al. | |
| 6,745,281 | B1 | 6/2004 | Saegusa | |
| 6,754,755 | B1 | 6/2004 | Johnson et al. | |
| 6,760,793 | B2 | 7/2004 | Kelley | |
| 6,772,270 | B1 | 8/2004 | Kurpanek | |
| 6,779,071 | B1 | 8/2004 | Kallat et al. | |
| 6,820,168 | B2 | 11/2004 | Tanaka et al. | |
| 6,823,458 | B1 | 11/2004 | Lee et al. | |
| 6,831,916 | B1 | 12/2004 | Parthasarathy et al. | |
| 6,834,326 | B1 | 12/2004 | Wang et al. | |
| 6,859,825 | B1 | 2/2005 | Williams | |
| 6,874,053 | B2 | 3/2005 | Yasuda et al. | |
| 6,877,073 | B2 | 4/2005 | Sanada et al. | |
| 6,918,060 | B2 | 7/2005 | Fanning | |
| 6,944,617 | B2 | 9/2005 | Harriman | |
| 6,961,761 | B2 * | 11/2005 | Masuyama et al. | 709/220 |
| 7,013,353 | B2 | 3/2006 | Parthasarathy et al. | |
| 7,023,811 | B2 | 4/2006 | Pinto | |
| 7,024,510 | B2 | 4/2006 | Olarig | |
| 7,046,668 | B2 * | 5/2006 | Pettey et al. | 370/392 |
| 7,082,524 | B2 * | 7/2006 | Shah | 713/1 |
| 7,103,064 | B2 * | 9/2006 | Pettey et al. | 370/463 |
| 7,136,953 | B1 | 11/2006 | Bisson et al. | |
| 7,143,196 | B2 | 11/2006 | Rimmer et al. | |
| 7,152,128 | B2 | 12/2006 | Wehage et al. | |
| 7,180,887 | B1 * | 2/2007 | Schwaderer et al. | 370/351 |
| 7,188,209 | B2 | 3/2007 | Pettey et al. | |
| 7,194,517 | B2 * | 3/2007 | Conway et al. | 709/212 |
| 7,213,065 | B2 * | 5/2007 | Watt | 709/223 |
| 7,219,183 | B2 | 5/2007 | Pettey et al. | |
| 7,231,486 | B2 | 6/2007 | Ajanovic et al. | |
| 7,281,030 | B1 * | 10/2007 | Davis | 709/212 |
| 7,310,319 | B2 * | 12/2007 | Awsienko et al. | 370/254 |
| 7,418,522 | B2 * | 8/2008 | Berg | 709/250 |
| 7,421,578 | B1 | 9/2008 | Huang et al. | |
| 7,457,906 | B2 | 11/2008 | Pettey et al. | |
| 7,461,245 | B2 | 12/2008 | Nakayama et al. | |
| 7,493,416 | B2 | 2/2009 | Pettey | |
| 7,620,066 | B2 * | 11/2009 | Pettey et al. | 370/465 |
| 2001/0032280 | A1 | 10/2001 | Osakada et al. | |
| 2002/0016845 | A1 | 2/2002 | Palmer et al. | |
| 2002/0026558 | A1 | 2/2002 | Reuter et al. | |
| 2002/0027906 | A1 | 3/2002 | Athreya et al. | |
| 2002/0029319 | A1 | 3/2002 | Robbins et al. | |
| 2002/0052914 | A1 | 5/2002 | Zalewski et al. | |
| 2002/0071450 | A1 | 6/2002 | Gasbarro et al. | |
| 2002/0072892 | A1 | 6/2002 | Shirley | |
| 2002/0073257 | A1 * | 6/2002 | Beukema et al. | 710/105 |
| 2002/0078271 | A1 | 6/2002 | Berry | |
| 2002/0099901 | A1 | 7/2002 | Tanaka et al. | |
| 2002/0107903 | A1 * | 8/2002 | Richter et al. | 709/201 |
| 2002/0124114 | A1 * | 9/2002 | Bottom et al. | 709/251 |
| 2002/0126693 | A1 | 9/2002 | Stark et al. | |

| | | | |
|---|---|---|---|
| 2002/0172195 A1 | 11/2002 | Pekkala et al. | |
| 2002/0186694 A1 | 12/2002 | Mahajan et al. | |
| 2002/0191599 A1 | 12/2002 | Parthasarathy et al. | |
| 2003/0069975 A1 | 4/2003 | Abjanic et al. | |
| 2003/0069993 A1 | 4/2003 | Na et al. | |
| 2003/0079055 A1 | 4/2003 | Chen | |
| 2003/0091037 A1 | 5/2003 | Latif et al. | |
| 2003/0112805 A1 | 6/2003 | Stanton | |
| 2003/0123484 A1 | 7/2003 | Harriman | |
| 2003/0126202 A1 | 7/2003 | Watt | |
| 2003/0131105 A1 | 7/2003 | Czeiger et al. | |
| 2003/0158992 A1 | 8/2003 | Ajanovic et al. | |
| 2003/0163341 A1 | 8/2003 | Banerjee et al. | |
| 2003/0188060 A1 | 10/2003 | Van Hensbergen | |
| 2003/0200315 A1 | 10/2003 | Goldenberg et al. | |
| 2003/0200330 A1 | 10/2003 | Oelke et al. | |
| 2003/0204593 A1 | 10/2003 | Brown et al. | |
| 2003/0208531 A1 | 11/2003 | Matters et al. | |
| 2003/0208551 A1 | 11/2003 | Matters et al. | |
| 2003/0208631 A1 | 11/2003 | Matters et al. | |
| 2003/0208632 A1 | 11/2003 | Rimmer | |
| 2003/0208633 A1 | 11/2003 | Rimmer | |
| 2003/0212830 A1 | 11/2003 | Greenblat et al. | |
| 2003/0217183 A1 | 11/2003 | Rimmer et al. | |
| 2003/0235204 A1 | 12/2003 | Azevedo et al. | |
| 2004/0003140 A1 | 1/2004 | Rimmer | |
| 2004/0013092 A1 | 1/2004 | Betker et al. | |
| 2004/0013124 A1* | 1/2004 | Peebles et al. | 370/412 |
| 2004/0019714 A1 | 1/2004 | Kelley et al. | |
| 2004/0019726 A1 | 1/2004 | Kelley et al. | |
| 2004/0019729 A1 | 1/2004 | Kelley et al. | |
| 2004/0024894 A1 | 2/2004 | Osman et al. | |
| 2004/0024944 A1* | 2/2004 | Riley | 710/305 |
| 2004/0025166 A1 | 2/2004 | Adlung et al. | |
| 2004/0039892 A1* | 2/2004 | Goldschmidt | 711/170 |
| 2004/0054838 A1 | 3/2004 | Hoese et al. | |
| 2004/0068591 A1 | 4/2004 | Workman et al. | |
| 2004/0073712 A1 | 4/2004 | Larson et al. | |
| 2004/0073716 A1 | 4/2004 | Boom et al. | |
| 2004/0081104 A1 | 4/2004 | Pan et al. | |
| 2004/0088414 A1 | 5/2004 | Flynn et al. | |
| 2004/0098532 A1 | 5/2004 | Huang et al. | |
| 2004/0109460 A1 | 6/2004 | Banks et al. | |
| 2004/0109473 A1* | 6/2004 | Lebizay et al. | 370/466 |
| 2004/0111559 A1 | 6/2004 | Heil | |
| 2004/0116141 A1 | 6/2004 | Loven et al. | |
| 2004/0117516 A1 | 6/2004 | Date | |
| 2004/0117536 A1* | 6/2004 | Franke et al. | 710/302 |
| 2004/0117598 A1 | 6/2004 | Arimilli et al. | |
| 2004/0123014 A1 | 6/2004 | Schaefer et al. | |
| 2004/0128410 A1 | 7/2004 | Mayhew et al. | |
| 2004/0165588 A1 | 8/2004 | Pandya | |
| 2004/0186942 A1 | 9/2004 | Olarig | |
| 2004/0193737 A1 | 9/2004 | Huffman et al. | |
| 2004/0213211 A1 | 10/2004 | Green | |
| 2004/0221047 A1 | 11/2004 | Grover et al. | |
| 2004/0228280 A1 | 11/2004 | Moore et al. | |
| 2004/0233921 A1 | 11/2004 | Krieg et al. | |
| 2004/0249975 A1 | 12/2004 | Tuck et al. | |
| 2005/0050240 A1 | 3/2005 | Wilkins et al. | |
| 2005/0080982 A1 | 4/2005 | Vasilevsky et al. | |
| 2005/0097271 A1 | 5/2005 | Davies et al. | |
| 2005/0114623 A1 | 5/2005 | Craddock et al. | |
| 2005/0169258 A1 | 8/2005 | Millet et al. | |
| 2005/0238035 A1 | 10/2005 | Riley | |
| 2006/0092928 A1 | 5/2006 | Pike et al. | |
| 2006/0184711 A1 | 8/2006 | Pettey et al. | |
| 2006/0206655 A1 | 9/2006 | Chappell et al. | |
| 2007/0050520 A1 | 3/2007 | Riley | |
| 2008/0117909 A1 | 5/2008 | Johnson | |

FOREIGN PATENT DOCUMENTS

| | | |
|---|---|---|
| EP | 0935200 | 11/1999 |
| EP | 1115064 A2 | 7/2001 |
| EP | 1376932 A2 | 1/2004 |
| JP | 2002084311 A | 3/2002 |
| JP | 2002183102 A | 6/2002 |
| TW | 545015 | 8/2003 |
| WO | WO94/19749 | 1/1994 |
| WO | WO9929071 A1 | 6/1999 |
| WO | WO03085535 A2 | 10/2003 |

OTHER PUBLICATIONS

Dugan et al "N_Port Virtuatization: Proposed FC-FS Modifications." Jan. 19, 2002. Document No. 02-008v0. IBM Corporation. http://www.t11.org.

American National Standards Institute. "Fibre Channel—Framing and Signaling (FC-FS)." ANSI/INCITS Standard 373•2003. Oct. 22, 2003. pp. 307 and 311. American National Standards Institute, Inc. New York, NY, USA.

Ajay V Bhatt. "Creating a Third Generation I/O Interconnect" Jun. 4, 2003 INTEL, XP002354597 http://www.intel.com/technology/pciexpress/downloads/3rdGenWhitePaper.pdf retrieved on Nov. 15, 2005.

"PCI Express Base Specification." Revision 1.0. PCI-SIG. Apr. 29, 2002. pp. 17-18.

Mehta, Pranav. "Advanced Switching boosts PCI Express." EE Times. CommsDesign. Online Oct. 28, 2002. Retrieved from Internet Nov. 30, 2006, <http://www.commsdesign.com/design_corner/showArticle.jhtml?articleID=16505864>.

PCI Express Base Specificattion. Rev. 1.0. Apr. 29, 2002.

Cohen et al. "PCI Express Architecture Power Management." Rev 1.1. Nov. 8, 2002.

"Network Interface Controller." FOLDOC—Free On-Line Dictionary of Computing. Http://foldoc.org/index.cgi?query=network+interface+controller. Apr. 11, 2008.

PCI-SIG, PCI Local Bus Specification. Dec. 18, 1998. Revision 2.2, pp. 189-220. http://www.pcisig.com/home.

Koellner, Gregory. "NPIV Functionality Profile." Presentation, Jun. 5, 2002. Presentation # T11/02-340v0. Text # T11/02-338v0. www.t11.org.

Forouzan, Behrouz A. "Data Communications and Networking, Third Edition." pp. 528-536. McGraw-Hill, 2004, 2001, 1998.

Seifert, Rich. "The Switch Book, The Complete Guide to LAN Switching Technology." pp. 431-473. John Wiley & Sons. 2000.

"Catalyst 3550 Multilayer Switch Software Configuration Guide." Chapter 13, pp. 1-14. Cisco Systems. Apr. 2002.

"802.1Q, IEEE Standards for Local and Metropolitan Area Networks, Virtual Bridged Local Area Networks." IEEE. May 7, 2003.

Holland et al. "Dynamic Switching between One-to-Many Download Methods I "ALL-IP" Cellular Networks" (abstract only) Publication date: May-Jun. 2006.

INCITS working draft prorposed American National Standard for Information Technology, Fibre Channel Framing and Signaling-2 (FC-FS-2). Jan. 16, 2004. Rev. 0.05. pp. i, 65, 67, 76, 80. http://www.t11.org/index.html.

PCI-SIG, PCI Local Bus Specification. Dec. 18, 1998. Revision 2.2, pp. 214-220. http://www.pcisig.com/home.

PCI-SIG, PCI Express Base Specification. Apr. 15, 2003. Revision 1.0a. pp. 27, 259-260. http://www.pcisig.com/home.

Kleiman et al. "SunOS on SPARC." (abstract only) Publication Date: Feb. 29-Mar. 3, 1988.

Solomon et al.: "Advanced Switching Architecture", XP002328190. Intel Developer Forum. Sep. 17, 2003. pp. 32-54. Retrieved from the Internet: URL:http://www.asi-sig.org/education/AS_Architecture_and_PI-8_Overview_-_Spring_IDF_2004_FINAL.pdf.

"XILINX, Designing Network Attached Storage Platform With Advanced Switching" (XP002328191). Sep. 16, 2003. Retrieved from the Internet: URL:http://www.asi-sig.org/education/usage/xilinx_storage_usage.pdf.

Karin S. Puranik: "Advanced Switching Extends PCI Express" XCELL Journal, (XP002328192). Retrieved from the Internet: URL:www.xilinx.com/publications/xcellonline/xcell_47/xc_pdf/xc_pcix47.pdf.

Anonymous: "Fabrics and Application Characteristics for AdvancedTCA* Architectures" Intel Technology Journal, vol. 7, No. 4, Nov. 14, 2003 (XP002328193), ISSN: 1535-864X. Retrieved from the Internet: URL:www.intel.com/technology/itj/2003/volume07issue04/art02_fabrics/vol7iss4art02.pdf.

David Mayhew et al. "PCI Express and Advanced Switching: Evolutionary Path to Building Next Generation Interconnects" High Performance Interconnects, 2003. Proceedings. 11th Symposium on Aug. 20-22, 2003, Piscataway, NJ, USA. IEEE, Aug. 20, 2003, pp. 21-29, (XP010657970). ISBN: 0-7695-2012-X.

Marek Piekarski. "Advanced Switching Interconnect and Blade Server Re-Purposing in the Data Center." Aug. 21, 2004. XP002341367. URL: http://www.asi-sig.org/education/white papers/ASWhitePaper_Final_Copy.pdf.

"Understanding PCI Bus, PCI-Express and InfiniBand Architecture" (White Paper); Mellanox Technologies, Inc; 2900 Stender Way, Santa Clara, CA 95054; Document No. 2006WP.

* cited by examiner

EMBODIMENTS OF DESCRIPTOR LOGIC

BLOCK DIAGRAM OF PRIOR ART NETWORK INTERFACE CONTROLLER

METHOD AND APPARATUS FOR A SHARED I/O NETWORK INTERFACE CONTROLLER

CROSS REFERENCE TO RELATED APPLICATION(S)

This application Ser. No. 10/909,254 claims benefit of provisional patent applications 60/491,314 filed Jul. 30, 2003, 60/515,558 filed Oct. 29, 2003, 60/523,522 filed Nov. 19, 2003, 60/541,673 filed Feb. 4, 2004, 60/555,127 filed Mar. 22, 2004, 60/575,005 filed May 27, 2004, 60/588,941 filed Jul. 19, 2004, and 60/589,174 filed Jul. 19, 2004.

This application Ser. No. 10/909,254 is a CIP of each of Ser. No. 10/757,714 Jan. 14, 2004 U.S. Pat. No. 7,046,668, Ser. No. 10/757,713 Jan. 14, 2004, now U.S. Pat. No. 7,457,906, and 10/757,711 Jan. 14, 2004 U.S. Pat. No. 7,103,064, each of which claims benefit of 60/440,788 Jan. 21, 2003, 60/440,789 Jan. 21, 2003, 60/464,382 Apr. 18, 2003, 60/491,314 Jul. 30, 2003, 60/515,558 Oct. 29, 2003, 60/523,522 Nov. 19, 2003.

This application Ser. No. 10/909,254 is a CIP of Ser. No. 10/802,532 Mar. 16, 2004 now U.S. Pat. No. 7,836,211 which claims benefit of 60/464,382 Apr. 18, 2003, 60/491,314 Jul. 30, 2003, 60/515,558 Oct. 29, 2003, 60/523,522 Nov. 19, 2003, 60/541,673 Feb. 4. 2004.

Application Ser. No. 10/802,532 is a CIP of each of Ser. No. 10/757,714 Jan. 14, 2004 U.S. Pat. No. 7,046,668, Ser. No. 10/757,713 Jan. 14, 2004, and Ser. No. 10/757,711 Jan. 14, 2004 U.S. Pat. No. 7,103,064, each of which claims benefit of 60/440,788 Jan. 21, 2003, 60/440,789 Jan. 21, 2003, 60/464,382 Apr. 18, 2003, 60/491,314 Jul. 30, 2003, 60/515,558 Oct. 29, 2003, 60/523,522 Nov. 19, 2003.

This application Ser. No. 10/909,254 is a CIP of Ser. No. 10/864,766 Jun. 9, 2004 now U.S. No. 7,664,909 which claims benefit of 60/464,382 Apr. 18, 2003, 60/491,314 Jul. 30, 2003, 60/515,558 Oct. 29, 2003, 60/523,522 Nov. 19, 2003, 60/541,673 Feb. 4, 2004, 60/555,127 Mar. 22, 2004, Application Ser. No. 10/864,766 is a CIP of each of Ser. No. 10/757,714 Jan. 14, 2004 U.S. Pat. No. 7,046,668, Ser. No. 10/757,713 Jan. 14, 2004, and Ser, No. 10/757,711 Jan. 14, 2004 U.S. Pat. No. 7,103,064, each of which claims benefit of 60/440,788 Jan. 21, 2003, 60/440,789 Jan. 21, 2003, 60/464,382 Apr. 18, 2003, 60/491,314 Jul. 30, 2003, 60/515,558 Oct. 29, 2003, 60/523,522 Nov. 19, 2003, Application Ser. No. 10/864,766 is a CIP of Ser. No. 10/802,532 Mar. 16, 2004 which claims benefit of 60/464,382 Apr. 18, 2003, 60/491,314 Jul. 30, 2003, 60/515,558 Oct. 29, 2003, 60/523,522 Nov. 19, 2003, 60/541,673 Feb. 4, 2004.

Application Ser. No. 10/802,532 is a CIP of Ser. No. 10/757,714 Jan. 14, 2004 U.S. Pat. No. 7,046,668, Ser. No. 10/757,713 Jan. 14, 2004, and Ser. No. 10/757,711 Jan. 14, 2004 U.S. Pat. No. 7,103,064, each of which claims benefit of 60/440,788 Jan. 21, 2003, 60/440,789 Jan. 21, 2003, 60/464,382 Apr. 18, 2003, 60/491,314 Jul. 30, 2003, 60/515,558 Oct. 29, 2003, 60/523,522 Nov. 19, 2003.

This application Ser. No 10/909,254 is a CIP of Ser. No. 10/827,622 Apr. 19, 2004 U.S. Pat. No. 7,219,183 which claims benefit of 60/464,382 Apr. 18, 2003, 60/491,314 Jul. 30, 2003, 60/515,558 Oct. 29, 2003, 60/523,522 Nov. 19, 2003, 60/541,673 Feb. 4, 2004.

Application Ser. No. 10/827,622 is a CIP of Ser. No. 10/802,532 Mar. 16, 2004 which claims benefit of 60/464,382 Apr. 18, 2003, 60/491,314 Jul. 30, 2003, 60/515,558 Oct. 29, 2003, 60/523,522 Nov. 19, 2003, 60/541,673 Feb. 4, 2004.

Application Ser. No. 10/802,532 is a CIP of each of Ser. No. 10/757,714 Jan. 14, 2004 U.S. Pat. No. 7,046,668, Ser. No. 10/757,713 Jan. 14, 2004, and Ser. No. 10/757,711 Jan. 14, 2004 U.S. Pat. No. 7,103,064, each of which claims benefit of 60/440,788 Jan. 21, 2003, 60/440,789 Jan. 21, 2003, 60/464,382 Apr. 18, 2003, 60/491,314 Jul. 30, 2003, 60/515,558 Oct. 29, 2003, 60/523,522 Nov. 19, 2003.

This application Ser. No. 10/909,254 is a CIP of each of Ser. No. 10/827,620 Apr. 19, 2004, now U.S. Pat. No. 8,102,843, and Ser. No. 10/827,117 Apr. 19, 2004 U.S. Pat. No. 7,188,209, each of which claims benefit of 60/464,382 Apr. 18, 2003, 60/491,314 Jul. 30, 2003, 60/515,558 Oct. 29, 2003, 60/523,522 Nov. 19, 2003, 60/541,673 Feb. 4, 2004.

Applications Ser. No. 10/827,620 and Ser. No. 10/827,117 are each a CIP of Ser. No. 10/802,532 Mar. 16, 2004 which claims benefit of 60/464,382 Apr. 18, 2003, 60/491,314 Jul. 30, 2003, 60/515,558 Oct. 29, 2003, 60/523,522 Nov. 19, 2003, 60/541,673 Feb. 4, 2004.

FIELD OF THE INVENTION

This invention relates in general to the field of computer network architecture, and more specifically to an architecture to allow sharing and/or partitioning of network input/output (I/O) endpoint devices in a load/store fabric, particularly a shared network interface controller.

BACKGROUND OF THE INVENTION

Although the eight above referenced pending patent applications have been incorporated by reference, to assist the reader in appreciating the problem to which the present invention is directed, the Background of those applications is substantially repeated below.

Modern computer architecture may be viewed as having three distinct subsystems which when combined, form what most think of when they hear the term computer. These subsystems are: 1) a processing complex; 2) an interface between the processing complex and I/O controllers or devices; and 3) the I/O (i.e., input/output) controllers or devices themselves.

A processing complex may be as simple as a single microprocessor, such as a Pentium microprocessor, coupled to memory. Or, it might be as complex as two or more processors which share memory.

The interface between the processing complex and I/O is commonly known as the chipset. On the north side of the chipset (i.e., between the processing complex and the chipset) is a bus referred to as the HOST bus. The HOST bus is usually a proprietary bus designed to interface to memory, to one or more microprocessors within the processing complex, and to the chipset. On the south side of the chipset are a number of buses which connect the chipset to I/O devices. Examples of such buses include: ISA, EISA, PCI, PCI-X, and AGP.

I/O devices are devices that allow data to be transferred to or from the processing complex through the chipset, on one or more of the buses supported by the chipset. Examples of I/O devices include: graphics cards coupled to a computer display; disk controllers, such as Serial ATA (SATA) or Fiber Channel controllers (which are coupled to hard disk drives or other data storage systems); network controllers (to interface to networks such as Ethernet); USB and Firewire controllers which interface to a variety of devices from digital cameras to external data storage to digital music systems, etc.; and PS/2 controllers for interfacing to keyboards/mice. The I/O devices are designed to connect to the chipset via one of its supported interface buses. For example, modern computers typically couple graphic cards to the chipset via an AGP bus. Ethernet cards, SATA, Fiber Channel, and SCSI (data storage) cards, USB and Firewire controllers all connect to a PCI bus, and PS/2 devices connect to an ISA bus.

One skilled in the art will appreciate that the above description is general. However, what should be appreciated is that regardless of the type of computer, it will include a processing complex for executing instructions, an interface to I/O, and I/O devices to allow the processing complex to communicate with the world outside of itself. This is true whether the computer is an inexpensive desktop in a home, a high-end workstation used for graphics and video editing, or a clustered server which provides database support to hundreds within a large organization.

Also, although not yet referenced, a processing complex typically executes one or more operating systems (e.g., Microsoft Windows, Windows Server, Unix, Linux, Macintosh, etc.). This application therefore refers to the combination of a processing complex with one or more operating systems as an operating system domain (OSD). An OS domain, within the present context, is a system load-store memory map that is associated with one or more processing complexes. Typically, present day operating systems such as Windows, Unix, Linux, VxWorks, Macintosh, etc., must comport with a specific load-store memory map that corresponds to the processing complex upon which they execute. For example, a typical x86 load-store memory map provides for both memory space and I/O space. Conventional memory is mapped to the lower 640 kilobytes (KB) of memory. The next higher 128 KB of memory are employed by legacy video devices. Above that is another 128 KB block of addresses mapped to expansion ROM. And the 128 KB block of addresses below the 1 megabyte (MB) boundary is mapped to boot ROM (i.e., BIOS). Both DRAM space and PCI memory are mapped above the 1 MB boundary. Accordingly, two separate processing complexes may be executing within two distinct OS domains, which typically means that the two processing complexes are executing either two instances of the same operating system or that they are executing two distinct operating systems. However, in a symmetrical multi-processing environment, a plurality of processing complexes may together be executing a single instance of an SMP operating system, in which case the plurality of processing complexes would be associated with a single OS domain.

A problem that has been recognized by the present inventor is that the requirement to place a processing complex, interface and I/O within every computer is costly, and lacks modularity. That is, once a computer is purchased, all of the subsystems are static from the standpoint of the user. The ability to change a processing complex while still utilizing the interface and I/O is extremely difficult. The interface or chipset is typically so tied to the processing complex that swapping one without the other doesn't make sense. And, the I/O is typically integrated within the computer, at least for servers and business desktops, such that upgrade or modification of the I/O is either impossible or cost prohibitive.

An example of the above limitations is considered helpful. A popular network server designed by Dell Computer Corporation is the Dell PowerEdge 1750. This server includes one or more microprocessors designed by Intel (Xeon processors), along with memory (e.g., the processing complex). It has a server class chipset for interfacing the processing complex to I/O (e.g., the interface). And, it has onboard graphics for connecting to a display, onboard PS/2 for connecting a mouse/keyboard, onboard RAID control for connecting to data storage, onboard network interface controllers for connecting to $10/100$ and 1 gig Ethernet; and a PCI bus for adding other I/O such as SCSI or Fiber Channel controllers. It is believed that none of the onboard features are upgradeable.

So, as mentioned above, one of the problems with this architecture is that if another I/O demand emerges, it is difficult, or cost prohibitive to implement the upgrade. For example, 10 gigabit Ethernet is on the horizon. How can this be easily added to this server? Well, perhaps a 10 gig Ethernet controller could be purchased and inserted onto the PCI bus. Consider a technology infrastructure that included tens or hundreds of these servers. To move to a faster network architecture requires an upgrade to each of the existing servers. This is an extremely cost prohibitive scenario, which is why it is very difficult to upgrade existing network infrastructures.

This one-to-one correspondence between the processing complex, the interface, and the I/O is also costly to the manufacturer. That is, in the example above, much of the I/O is manufactured on the motherboard of the server. To include the I/O on the motherboard is costly to the manufacturer, and ultimately to the end user. If the end user utilizes all of the I/O provided, then s/he is happy. But, if the end user does not wish to utilize the onboard RAID, or the $10/100$ Ethernet, then s/he is still required to pay for its inclusion. This is not optimal.

Consider another emerging platform, the blade server. A blade server is essentially a processing complex, an interface, and I/O together on a relatively small printed circuit board that has a backplane connector. The blade is made to be inserted with other blades into a chassis that has a form factor similar to a rack server today. The benefit is that many blades can be located in the same rack space previously required by just one or two rack servers. While blades have seen market growth in some areas, where processing density is a real issue, they have yet to gain significant market share, for many reasons. One of the reasons is cost. That is, blade servers still must provide all of the features of a pedestal or rack server, including a processing complex, an interface to I/O, and I/O. Further, the blade servers must integrate all necessary I/O because they do not have an external bus which would allow them to add other I/O on to them. So, each blade must include such I/O as Ethernet ($10/100$, and/or 1 gig), and data storage control (SCSI, Fiber Channel, etc.).

One recent development to try and allow multiple processing complexes to separate themselves from I/O devices was introduced by Intel and other vendors. It is called Infiniband. Infiniband is a high-speed serial interconnect designed to provide for multiple, out of the box interconnects. However, it is a switched, channel-based architecture that is not part of the load-store architecture of the processing complex. That is, it uses message passing where the processing complex communicates with a Host-Channel-Adapter (HCA) which then communicates with all downstream devices, such as I/O devices. It is the HCA that handles all the transport to the Infiniband fabric rather than the processing complex. That is, the only device that is within the load/store domain of the processing complex is the HCA. What this means is that you have to leave the processing complex domain to get to your I/O devices. This jump out of processing complex domain (the load/store domain) is one of the things that contributed to Infinibands failure as a solution to shared I/O. According to one industry analyst referring to Infiniband, "[i]t was over-billed, overhyped to be the nirvana for everything server, everything I/O, the solution to every problem you can imagine in the data center . . . but turned out to be more complex and expensive to deploy . . . because it required installing a new cabling system and significant investments in yet another switched high speed serial interconnect".

Thus, the inventor has recognized that separation between the processing complex and its interface, and I/O, should occur, but the separation must not impact either existing operating systems, software, or existing hardware or hardware infrastructures. By breaking apart the processing complex from the I/O, more cost effective and flexible solutions can be introduced.

Further, the inventor has recognized that the solution must not be a channel-based architecture, performed outside of the box. Rather, the solution should use a load-store architecture, where the processing complex sends data directly to (or at least architecturally directly) or receives data directly from an I/O device (such as a network controller, or data storage controller). This allows the separation to be accomplished without affecting a network infrastructure or disrupting the operating system.

Therefore, what is needed is an apparatus and method which separates the processing complex and its interface to I/O from the I/O devices.

Further, what is needed is an apparatus and method which allows processing complexes and their interfaces to be designed, manufactured, and sold, without requiring I/O to be included within them.

Additionally, what is needed is an apparatus and method which allows a single I/O device to be shared by multiple processing complexes.

Further, what is needed is an apparatus and method that allows multiple processing complexes to share one or more I/O devices through a common load-store fabric.

Additionally, what is needed is an apparatus and method that provides switching between multiple processing complexes and shared I/O.

Further, what is needed is an apparatus and method that allows multiple processing complexes, each operating independently, and having their own operating system domain, to view shared I/O devices as if the I/O devices were dedicated to them.

And, what is needed is an apparatus and method which allows shared I/O devices to be utilized by different processing complexes without requiring modification to the processing complexes existing operating systems or other software. Of course, one skilled in the art will appreciate that modification of driver software may allow for increased functionality within the shared environment.

The previously filed applications from which this application depends address each of these needs. However, in addition to the above, what is further needed is an I/O device that can be shared by two or more processing complexes using a common load-store fabric.

Further, what is needed is a network interface controller which can be shared, or mapped, to one or more processing complexes (or OSD's) using a common load-store fabric. Network interface controllers, Ethernet controllers ($10/100$, 1 gig, and 10 gig) are all implementations of a network interface controller (NIC).

SUMMARY

The present invention provides a method and apparatus for allowing a network interface controller to be shared by one or more operating system domains within the load-store domains of processing complexes.

In one aspect, the present invention provides a shareable network interface controller to be shared within the load-store architecture of a number of operating system domains. The controller includes transmit/receive logic, a bus interface, and association logic. The transmit/receive logic couples the controller to a network to transmit/receive network communication. The bus interface includes operating system domain identification logic, and interfaces the controller to the operating system domains (OSD's), and for associates OSD communication to and from the bus interface with ones of the OSD's. The association logic is coupled to the transmit/receive logic, and associates the network communication with ones of the OSD's. By associating the network communication with the OSD's, and associating the OSD communication with the OSD's, the shared controller provides communication between the OSD's and the network.

An additional feature of this invention includes a number of control status register sets (CSR's), coupled to the bus interface, and available to be associated with a unique one of the operating system domains. That is, for each OSD to be connected to the controller, a CSR set is made available to allow the controller to be mapped within the load-store domain of each OSD.

Another feature of this invention includes a descriptor cache coupled to the bus interface to store descriptors retrieved from the plurality of operating system domains.

An additional feature of this invention includes a number of direct memory access (DMA) engines, the engines used by the controller to DMA OSD communication from the OSD's, and to DMA the network communication to the OSD's.

In another aspect, the present invention provides a network interface controller (NIC) which provides an interface between a network and a number of operating system domains, where the controller exists within the load-store domain of each of the operating system domains (OSD's). The controller includes a bus interface, a network interface and association logic. The bus interface is located between the operating system domains and the controller. The network interface is located between the network and the controller. The association logic is coupled to both the bus interface and the network interface and associates data coming from the network with at least one of the plurality of operating system domains.

In a further aspect, the present invention provides a shared network interface controller (NIC) which allows a number of computer servers to interface to an Ethernet network. The controller includes: a bus interface to couple the controller to a packet based load-store serial link, the load-store serial link coupling each of the computer servers to the controller; server identification logic, coupled to the bus interface, to identify packets received by the bus interface with ones of the computer servers; buffering logic, coupled to the server identification logic, to store the packets received by the bus interface, along with tags to associate the packets with ones of the computer servers; association logic, coupled to the buffering logic, to determine MAC addresses for the packets utilizing the tags; and transmit/receive logic, coupled to the Ethernet network, and to the association logic, to transmit the packets to the Ethernet network, and to receive packets from the Ethernet network. By associating packets with ones of the computer servers, and buffering the packets between the computer servers and the Ethernet network, the shared network interface controller provides an Ethernet interface for all of the computer servers via the packet based load-store serial link.

In yet another aspect, the present invention provides a blade server environment including: a number of blade servers; a shared switch to couple to the blade servers, and to provide communication between the blade servers and a downstream endpoint, the downstream endpoint being a shared network interface controller. The controller includes: a bus interface to couple the controller to the shared switch; identification logic, to determine which of the blade servers is associated with data packets received by the controller; transmit/receive logic, to couple the controller to an Ethernet network; buffer logic, coupled to the bus interface and to the transmit/receive logic, to buffer the data packets received by the controller, either from the shared switch, or from the Ethernet network; and association logic, coupled to the buffer logic, to determine from a MAC address, which of the blade servers should be associated with the data packets.

In a further aspect, the present invention provides a method for sharing a network interface controller by a number of operating system domains. The method includes: providing a load-store domain link between the controller and the operating system domains; providing OSD identification for data transmitted over the load-store domain link; providing an interface between the controller and a network; buffering data between the load-store domain link and the network; and associating the buffered data with the operating system domains, the associating utilizing association logic to associate MAC addresses within the buffered data with ones of the operating system domains.

In yet another aspect, the present invention provides a method for correlating Ethernet packets within a shared network interface controller with a number of upstream operating system domains. The method includes: receiving the packets into the shared network interface controller; associating the packets with the upstream operating system domains by correlating destination MAC addresses within the packets with ones of the upstream operating system domains; caching descriptors for each of the upstream operating system domains which define where in their memories the packets are to be transferred; and transferring the packets, per the descriptors, to the upstream operating system domains via a load-store link which allows the packets to be tagged with information which associates the packets with their upstream operating system domain.

In a further aspect, the present invention provides a method for transmitting packets from a number of operating system domains to an Ethernet network thru a shared network interface controller. The method includes: requesting a packet transmit from one of the operating system domains to the controller; tagging the request with an OSD header to associate the request with its operating system domain; transmitting the request to the shared network interface controller; within the shared network interface controller, correlating the request with its operating system domain; utilizing the OSD header for the request to determine associated descriptors for the request; transferring data from the operating system domain, corresponding to the request utilizing the associated descriptors; buffering the transferred data; and transmitting the buffered data to the Ethernet network.

In another aspect, the present invention provides a shared network interface controller to interface a number of operating system domains to a network. The controller includes: a bus interface, to interface the controller to a number of operating system domains; transmit/receive logic, to interface the controller to a network; and packet replication logic, coupled to the bus interface, to detect whether packets received from a first operating system domain is destined for a second operating system domain, and if the packets are destined for the second operating system domain, the logic causing the packets to be transferred to the second operating system domain.

In a further aspect, the present invention provides a method for determining a loopback condition within a shared network interface controller. The method includes: determining whether a packet transmitted by a first operating system domain is destined for a second operating system domain, the first and second operating system domains interfaced to each other, and to a network, through the shared network interface controller; if the packet is destined for the second operating system domain, forwarding the packet to the second operating system domain, and not forwarding the packet to the network; and if the packet is not destined for the second operating system domain, forwarding the packet to the network.

Other features and advantages of the present invention will become apparent upon study of the remaining portions of the specification and drawings.

DETAILED DESCRIPTION

Although the present invention may be implemented in any of a number of load-store fabrics, the below discussion is provided with particular reference to PCI-Express. One skilled in the art will appreciate that although embodiments of the present invention will be described within the context of PCI Express, a number of alternative, or yet to be developed load/store protocols might be used without departing from the spirit and scope of the present invention.

By way of background, Peripheral Component Interconnect (PCI) was developed in the early 1990's by Intel Corporation as a general I/O architecture to transfer data and instructions faster than the ISA architecture of the time. PCI has gone thru several improvements since that time, with the latest proposal being PCI Express. In a nutshell, PCI Express is a replacement of the PCI and PCI-X bus specification to provide platforms with much greater performance, while using a much lower pin count (Note: PCI and PCI-X are parallel bus architectures, PCI Express is a serial architecture). A complete discussion of PCI Express is beyond the scope of this specification, but a thorough background and description can be found in the following books which are incorporated herein by reference for all purposes: *Introduction to PCI Express, A Hardware and Software Developer's Guide*, by Adam Wilen, Justin Schade, Ron Thornburg; *The Complete PCI Express Reference, Design Insights for Hardware and Software Developers*, by Edward Solari and Brad Congdon; and *PCI Express System Architecture*, by Ravi Budruk, Don Anderson, Tom Shanley; all of which are available at www.amazon.com. In addition, the PCI Express specification is managed and disseminated through the Special Interest Group (SIG) for PCI found at www.pcisig.com.

This invention is also directed at describing a shared network interface controller. Interface controllers have existed to connect computers to a variety of networks, such as Ethernet, Token Ring, etc. However, Applicant's are unaware of any network interface controller that may be shared by multiple processing complexes as part of their load-store domain. While the present invention will be described with reference to interfacing to an Ethernet network, one skilled in the art will appreciate that the teachings of the present invention are applicable to any type of computer network.

Figure 1:
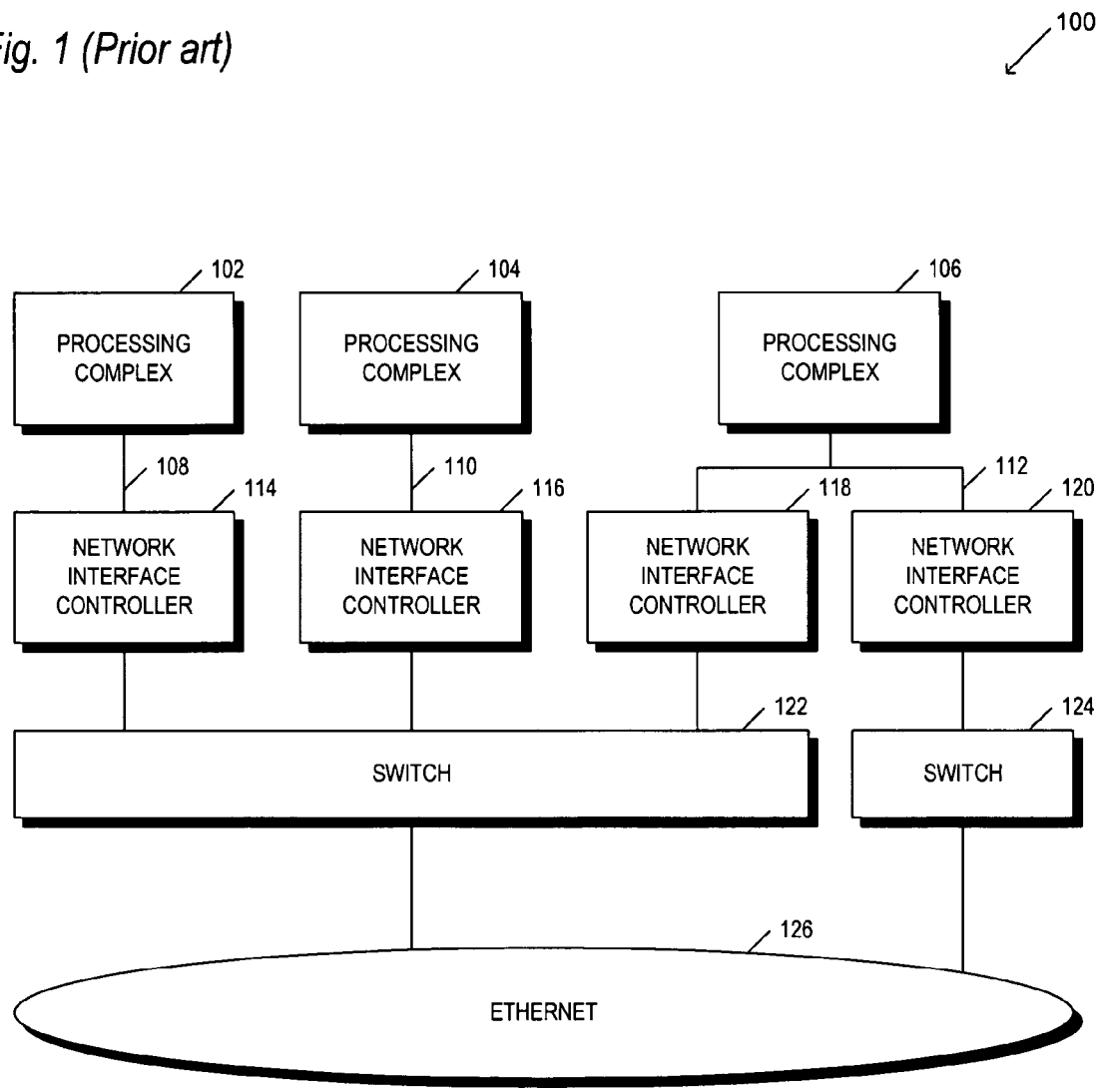
FIG. 1 is prior art block diagram of three processing complexes each with their own network interface controller (NIC) attached to an Ethernet network.

Referring now to FIG. 1, a block diagram 100 is provided illustrating three processing complexes 102, 104, 106, each having one or more network interface controllers 114, 116, 118, 120 for coupling the processing complexes 102, 104, 106 to the network 126 (via switches 122, 124). More specifically, processing complex 102 is coupled to network interface controller 114 via a load-store bus 108. The bus 108 may be any common bus such as PCI, PCI-X, or PCI-Express. Processing complex 104 is coupled to network interface controller 116 via load-store bus 110. Processing complex 106 is coupled to two network interface controllers 118, 120 via load-store bus 112. What should be appreciated by the Prior art illustration and discussion with respect to FIG. 1, is that each processing complex 102, 104, 106 requires its own network interface controller 114, 116, 118-120, respectively, to access the network 126.

Figure 2:
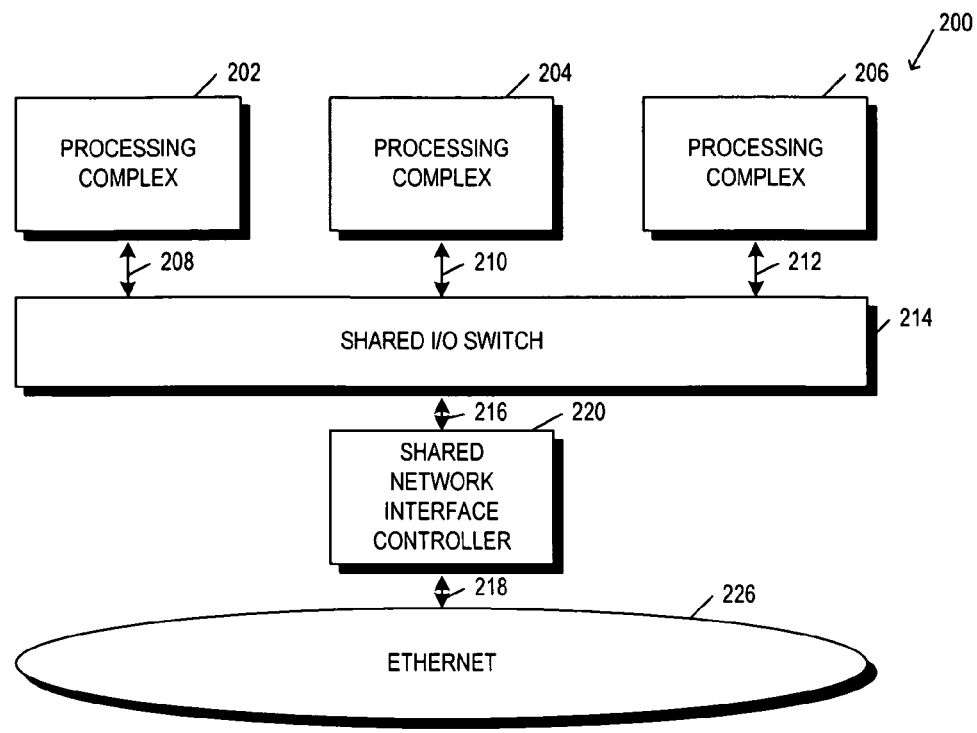
FIG. 2 is a block diagram of three processing complexes sharing a shared network interface controller via a shared I/O switch according to the present invention.

Referring now to FIG. 2, a block diagram 200 is shown which implements an embodiment of the present invention. More specifically, three processing complexes 202, 204, 206 are shown, each with their own load-store bus 208, 210, 212, coupled to a shared I/O switch 214. The shared I/O switch 214 is coupled to a shared network interface controller 220 via an operating system domain (OSD) aware load-store bus 216. Note: Details of one embodiment of an OSD aware load-store bus 216 are found in the parent applications referenced above. For purposes of the below discussion, this OSD aware load-store bus will be referred to as PCI-Express+. The shared network interface controller 220 is coupled to a network (such as Ethernet) 226.

As mentioned above, a processing complex may be as simple as a single microprocessor, such as a Pentium microprocessor, coupled to memory, or it might be as complex as two or more processors which share memory. The processing complex may execute a single operating system, or may execute multiple operating systems which share memory. In either case, applicant intends that from the viewpoint of the shared I/O switch 214, that whatever configuration of the processing complex, each load-store bus 208, 210, 212 be considered a separate operating system domain (OSD). At this point, it is sufficient that the reader understand that in the environment described with reference to FIG. 2, the load-store links 208, 210, 212 do not carry information to the shared I/O switch 214 that particularly associates the information with themselves. Rather, they utilize load-store links 208, 210, 212 as if they were attached directly to a dedicated network interface controller. The shared I/O switch 214 receives requests, and or data, (typically in the form of packets), over each of the load-store links 208, 210, 212. In the example of FIG. 2, the shared I/O switch 214 illustrates three upstream ports 208, 210, 212 coupled to the load-store links 208, 210, 212 which are non OSD aware, and one downstream port 216 coupled to an OSD aware load-store link 216. Although not shown, within the shared I/O switch 214 is a core, and mapping logic which tags, or associates packets received on the non OSD aware links 208, 210, 212 with their respective OSD. The shared I/O switch 214 then provides those packets to the downstream OSD aware link 216 with embedded information to associate those packets with their upstream link 208, 210, 212. Alternatively, the information to associate those packets with their upstream link 208, 210, 212 can be provided out of band via an alternate link (not shown). In either embodiment, the shared network interface controller 220 receives the OSD aware information via link 216 so that it can process the requests/data, per OSD.

In the reverse, when information flows from the network interface controller 220 to the shared I/O switch 214, the information is associated with the appropriate upstream link 208, 210, 212 by embedding (or providing out of band), OSD association for each piece of information (e.g., packet) transmitted over the link 216. The shared I/O switch 214 receives the OSD aware information via the link 216, determines which upstream port the information should be transmitted on, and then transmits the information on the associated link 208, 210, 212.

What should be appreciated by reference to FIG. 2 is that three processing complexes 202, 204, 206 all share the same shared network interface controller 220, which then provides them with access to the network 226. Complete details of the links 208, 210, 212 between the processing complexes 202, 204, 206 and the shared I/O switch 214 are provided in the parent applications which are referenced above and incorporated by reference. Attention will now be focused on the downstream OSD aware shared endpoint, particularly, embodiments of the shared network interface controller 220.

Figure 3:
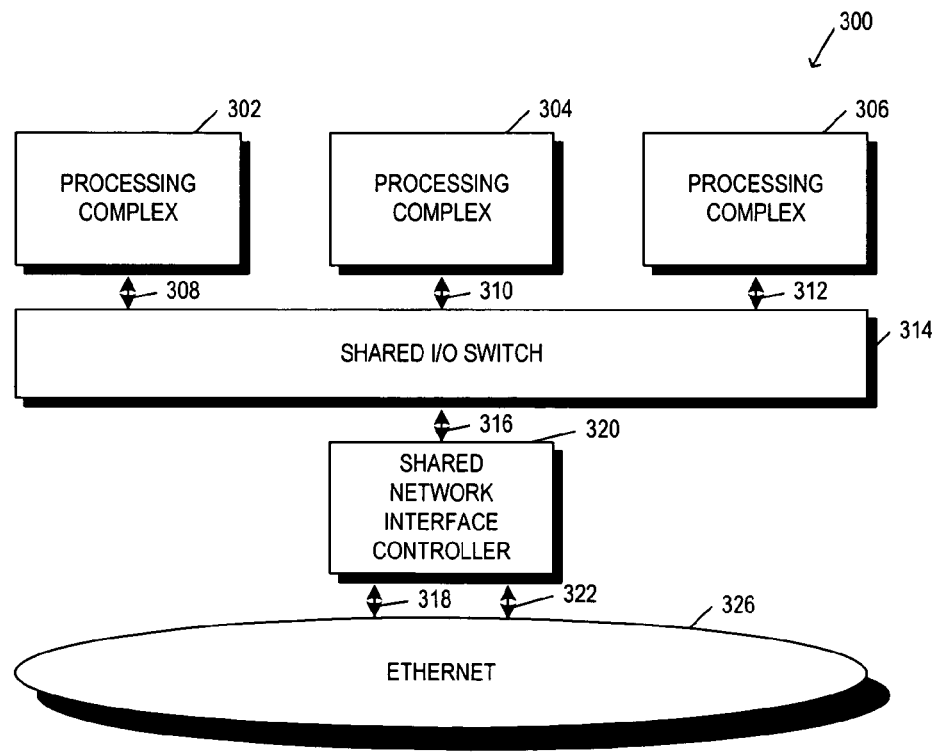
FIG. 3 is a block diagram of three processing complexes sharing a network interface controller having two Ethernet ports for coupling to an Ethernet according to the present invention.

Referring now to FIG. 3, a block diagram 300 is shown, substantially similar in architecture to the environment described above with respect to FIG. 2, elements referenced similarly, the hundred's digit being replaced with a 3. What is particularly called out, however, is a shared network interface controller 320 which has two connection ports 318, 322 coupling it to the network 326. The purpose of this is to illustrate that the network interface controller 320 should not be viewed as being a single downstream port device. Rather, the controller 320 may have 1-N downstream ports for coupling it to the network 326. In one embodiment, for example, the controller might have a 10/100 megabit port 318, and a 1 gigabit port 320. One skilled in the art will appreciate that other port speeds, or number of ports may also be utilized within the context of the present invention.

A detailed description of one embodiment of the shared network interface controller of the present invention will be described below with respect to FIG. 6. Operation of the shared network interface controller will later be described with reference to FIGS. 11-13. However, it is considered appropriate, before proceeding, to provide a high level overview of the operation of the system shown in FIG. 3.

Each of the processing complexes 302, 304, 306 are coupled to the shared I/O switch 314 via links 308, 310, 312. The links, in one embodiment, utilize PCI-Express. The shared I/O switch 314 couples each of the links 308, 310, 312 to downstream devices such as the shared network interface controller 320. In addition, the shared I/O switch 314 tags communication from each of the processing complexes 302, 304, 306 with an operating system domain header (OSD header) to indicate to the downstream devices, which of the processing complexes 302, 304, 306 is associated with the communication. Thus, when the shared network interface controller 320 receives a communication from the shared I/O switch 314, included in the communication is an OSD header. The controller 320 can utilize this header to determine which of the processing complexes 302, 304, 306 sent the communication, so that the controller 320 can deal with communication from each of the complexes 302, 304, 306 distinctly. In reverse, communication from the controller 320 to the processing complexes 302, 304, 306 gets tagged by the controller 320 with an OSD header, so that the shared I/O switch 314 can determine which of the processing complexes 302, 304, 306 the communication should be passed to. Thus, by tagging communication between the processing complexes 302, 304, 306 and the shared network interface controller 320 with an OSD header (or any other type of identifier), the controller 320 can distinguish communication between the different complexes it supports.

Figure 4:
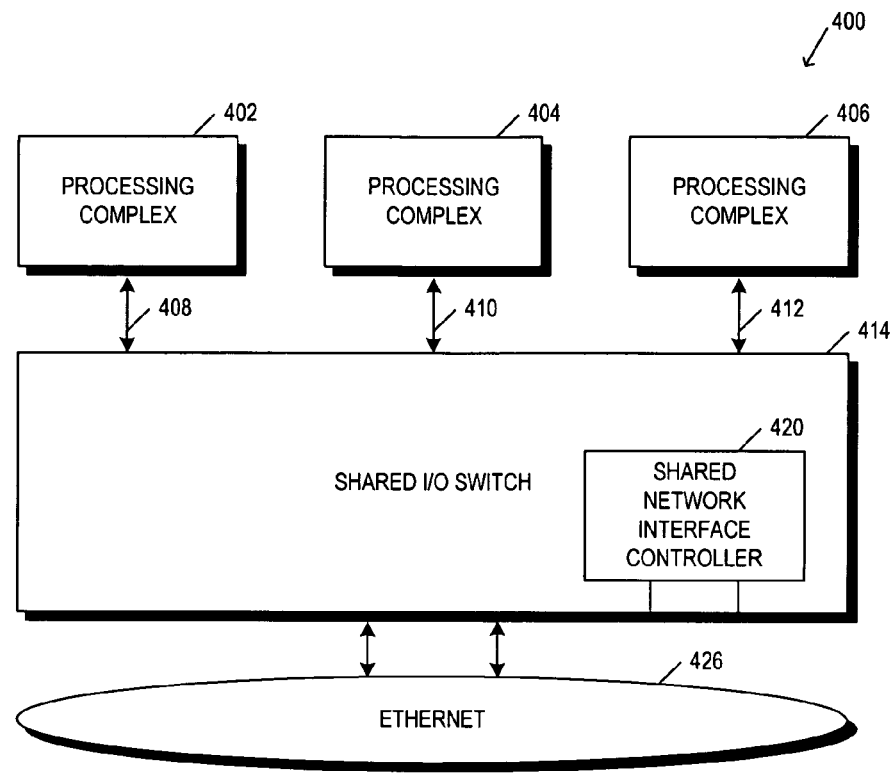
FIG. 4 is block diagram of three processing complexes communicating to a network using a shared switch having an embedded shared network interface controller according to the present invention.

Referring now to FIG. 4, a block diagram of an alternative embodiment of the present invention is shown, similar to that described above with respect to FIG. 3. Like references have like numbers, the hundreds digit replaced with a 4. In this embodiment, however, the shared I/O switch 414 has incorporated a shared network interface controller 420 within the switch. One skilled in the art will appreciate that such an embodiment is simply a packaging alternative to providing the shared network interface controller 420 as a separate device.

Figure 5:
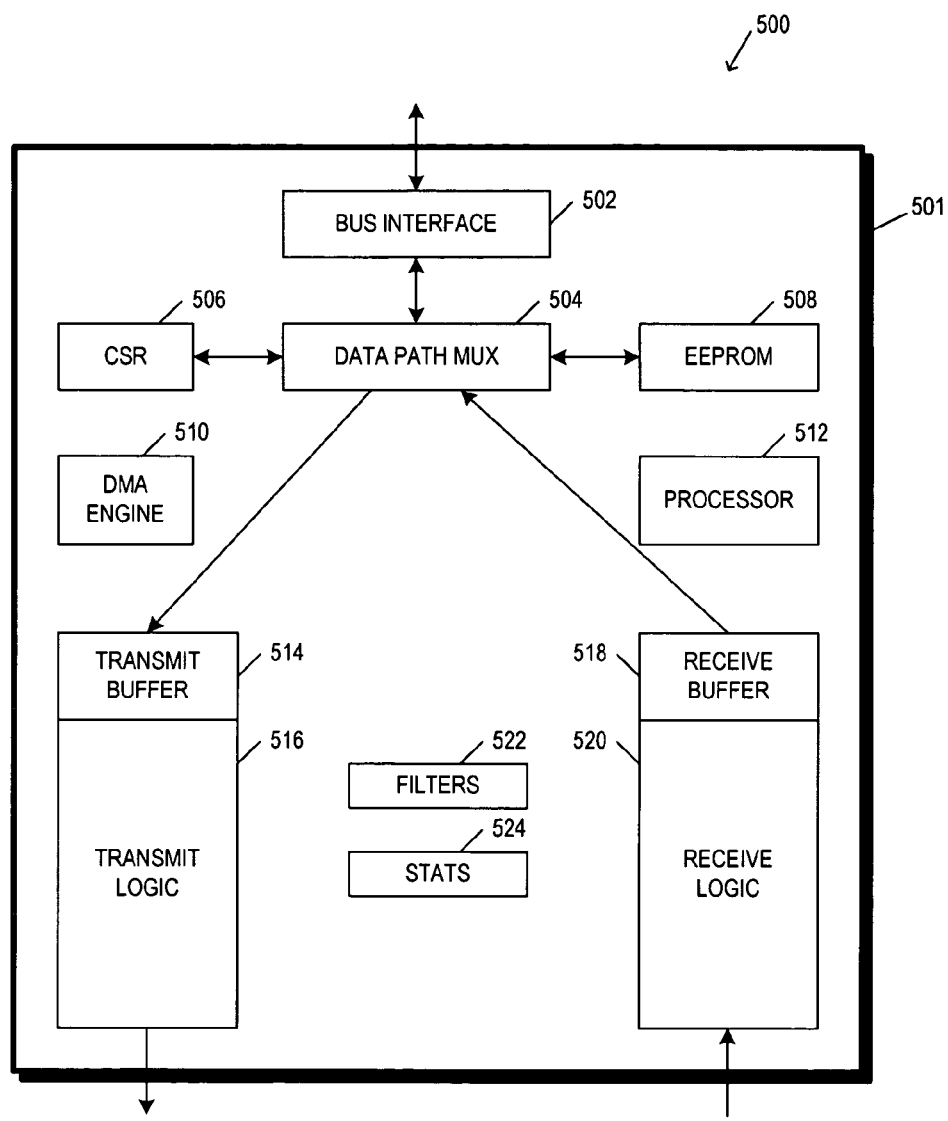
FIG. 5 is a block diagram of a prior art network interface controller.

Referring now to FIG. 5, a block diagram of a prior art non-shared network interface controller 500 is shown. The purpose of illustrating the prior art controller is not to detail an embodiment of an existing controller, but rather to provide a foundation so that differences between existing controllers and the shared controller of the present invention can be better appreciated. The controller 500 includes a bus interface 502 to interface the controller 502 to its computer (not shown). Modern controllers typically utilize some form of PCI (whether PCI, PCI-X, or PCI-Express is used) as their interface to their computer. The bus interface 502 is coupled to a data path mux 504 which provides an interface to the transmit and receive buffers 514, 518, respectively. The transmit and receive buffers 514, 518 are coupled to transmit and receive logic 516, 520, respectively which interface the controller to an Ethernet network (not shown). The controller further includes a CSR block 506 which provides the control status registers necessary for supporting communication to a single computer. And, the controller 500 includes a DMA engine 510 to allow data transfer from and to the computer coupled to the controller 500. In addition, the controller 500 includes an EEPROM 508 which typically includes programming for the controller 500, and the MAC address (or addresses) assigned to that controller for use with the computer to which it is coupled. Finally, the controller 500 includes a processor 512. One skilled in the art will appreciate that other details of an interface controller are not shown, but are not considered necessary to understand the distinctions between the prior art controller 500 and the shared network interface controller of the present invention.

Figure 6:
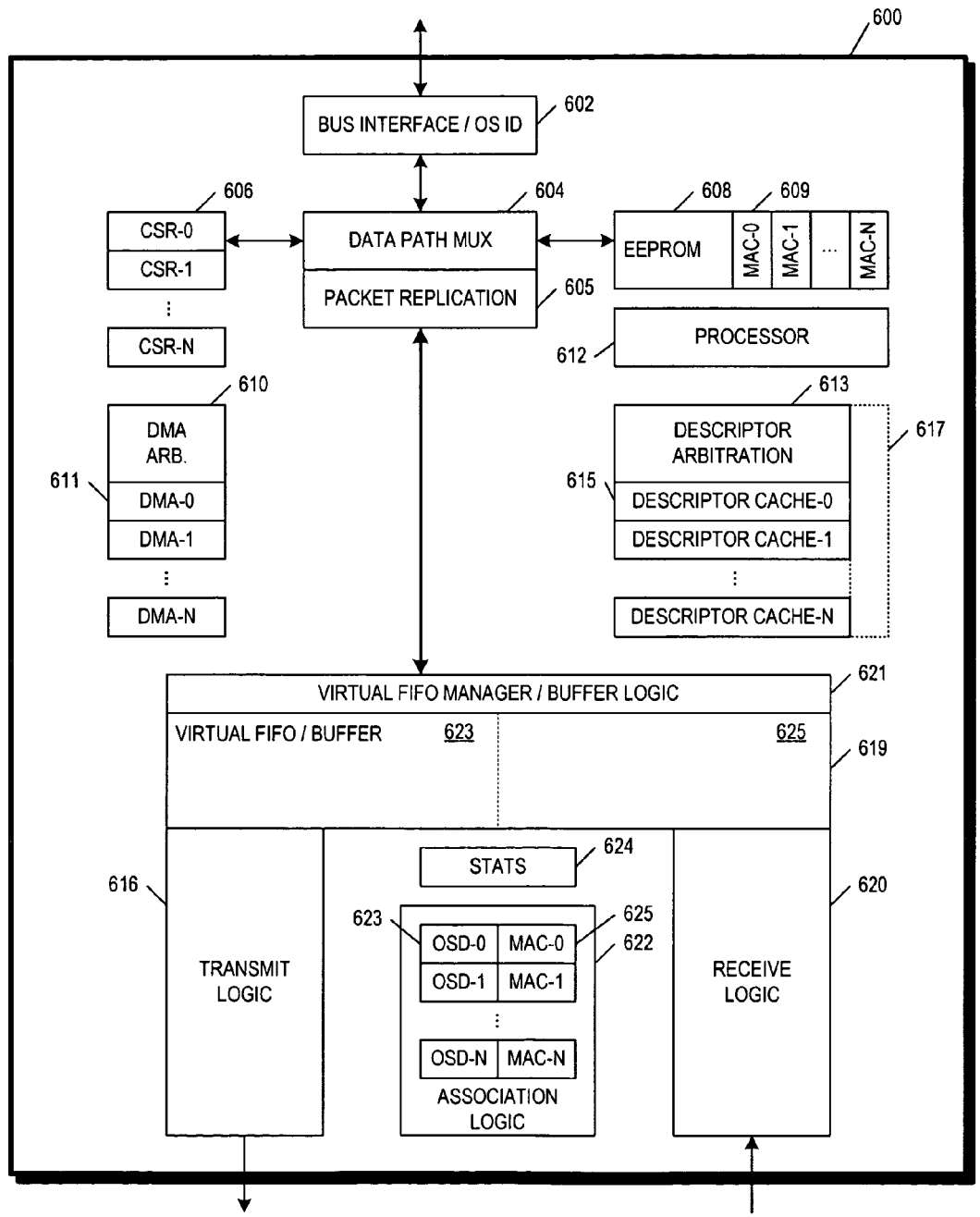
FIG. 6 is a block diagram of a network interface controller according to one embodiment of the present invention.

Referring now to FIG. 6, a block diagram is shown illustrating a shared network interface controller 600 according to the present invention. The controller 600 is illustrated with logic capable of supporting 1 to N number of distinct operating system domains. Thus, based on the desires of the manufacturer, the number of distinct operating system domains supported by the controller 600 of the present invention may be 2, 4, 8, 16, or any number desired by the manufacturer. Thus, rather than describing a controller 600 to support 2 or 3 operating system domains, applicant will describe the logic necessary to support 1 to N domains.

The controller 600 includes bus interface/OS ID logic 602 for interfacing the controller 600 to an upstream load/store shared I/O link such as described above with reference to FIGS. 2-3. As mentioned, one embodiment utilizes PCI-Express, but incorporates OSD header information to particularly call out which of the processing complexes the communication is from/to. Applicant's refer to this enhanced bus as PCI-Express+. Thus, the bus interface portion of the logic 602 provides the necessary electrical and logical operations to interface to PCI-Express, while the OSD ID portion of the logic 602 provides the necessary operations to determine for incoming communication, which of the upstream operating system domains are associated with the communication, and for outgoing communication, to tag the communication with the appropriate OSD for its upstream operating system domain.

The bus interface/OS ID logic 602 is coupled to a data path mux 604. The mux 604 is coupled to packet replication logic 605. In one embodiment, the packet replication logic 605 is used for loopback, multi-cast and broadcast operations. More specifically, since packets originating from one of the processing complexes may be destined for one or more of the other processing complexes for which the shared network interface controller 600 is coupled, the packet replication logic 605 performs the function of determining whether such packets should be transmitted to the Ethernet network, or alternatively, should be replicated and presented to one or more of the other processing complexes to which the controller 600 is coupled. Details of a multicast operation will be described below with reference to FIG. 13. And, details of the packet replication logic will be provided below with reference to FIG. 18.

The mux 604 is also coupled to a plurality of CSR blocks 606. As mentioned above, to establish communication to an operating system domain, a controller must have control status registers which are addressable by the operating system domain. These control status registers 606 have been duplicated in FIG. 6 for each operating system domain the designer desires to support (e.g., 2, 4, 8, 16, N). In one embodiment, to ease design, each of the CSR's 606 which are required to support an operating system domain (OSD) are duplicated for each supported OSD. In an alternative embodiment, only a subset of the CSR's 606 are duplicated, those being the registers whose contents will vary from OSD to OSD. Other ones of the CSR's 606 whose contents will not change from OSD to OSD may be not be duplicated, but rather will simply be made available to all supported OSD's. In one embodiment, the minimum number of CSR's 606 which should be duplicated includes the head and tail pointers to communicate with the OSD. And, if the drivers in the OSD are restricted to require that they share the same base address, then even the base address register (BAR) within the type 0 configuration space (e.g., in a PCI-Express environment) need not be duplicated. Thus, the requirement of duplicating some or all of the CSR's 606 is a design choice, in combination with the whether or not modifications to the software driver are made.

Figure 17:
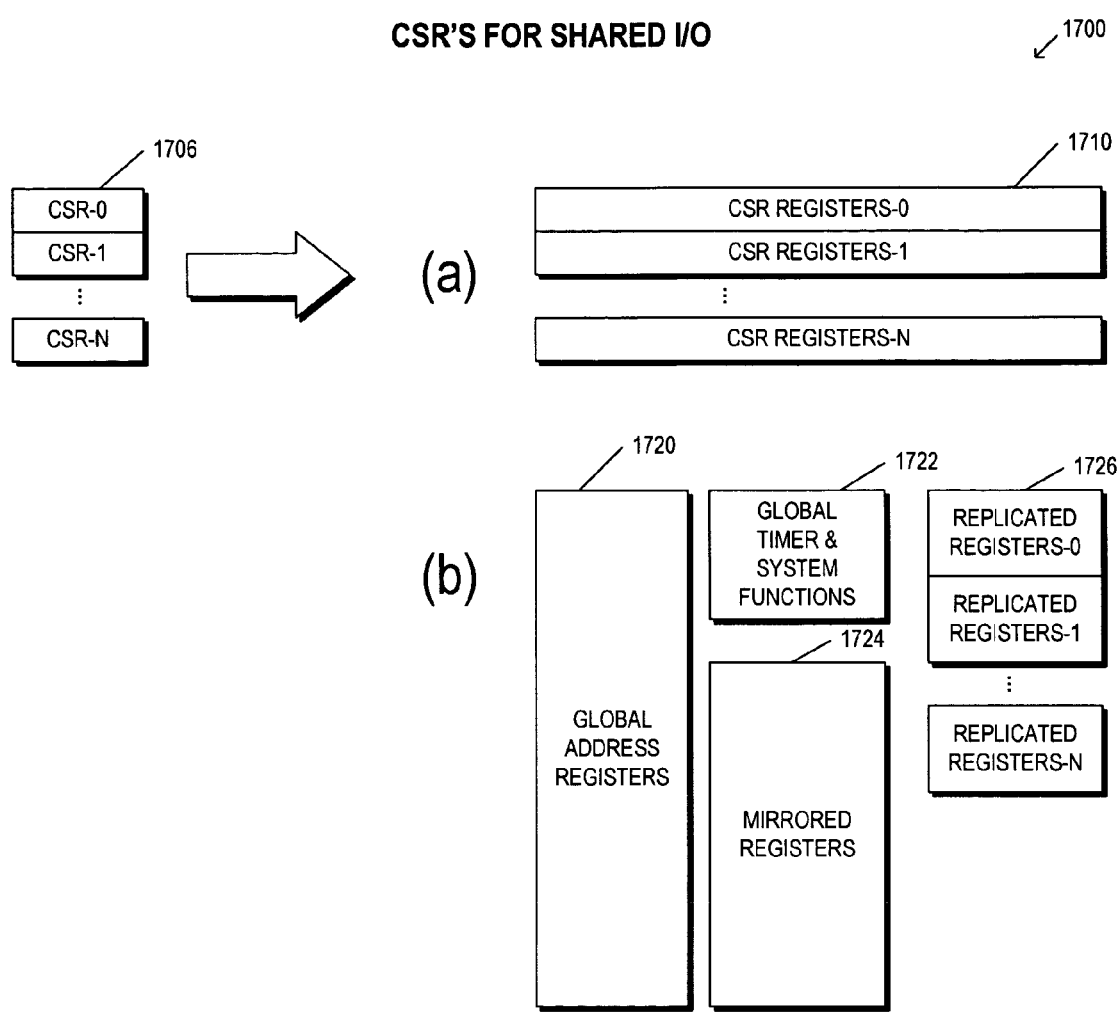
FIG. 17 is a block diagram illustrating alternative embodiments of control status registers within the shared network interface controller of the present invention.

Referring to FIG. 17, a block diagram illustrating a logical view of CSR block 606 is shown. More specifically, a first embodiment (a) illustrates a duplication of all of the CSR registers 606, one per supported OSD, as CSR registers 1710. Alternatively, a second embodiment (b) illustrates providing global timing and system functions 1722 to all supported OSD's, providing mirrored registers 1724 for others of the control status registers, and replicating a small set of registers 1726 (such as the head and tail pointers), per OSD. Applicant believes that embodiment (b) requires very little impact or change to the architecture of existing non shared controllers, while allowing them to utilize the novel aspects of the present invention. Moreover, as described above, the physical location of the CSR blocks need not reside on the same chip. For example, the global functions of the CSR block (such as timing and system functions) may reside on the controller 600, while the mirrored and/or replicated registers may be located in another chip or device. Thus, whether or not the CSR functions reside on the same chip, or are split apart to reside in different locations, both are envisioned by the inventor.

In one embodiment, the CSR's 606 contain the Control and Status Registers used by device drivers in the OSD's to interface to the controller 600. The CSR's 606 are responsible for generating interrupts to the interface between the OSD's and the controller 600. The CSR's 606 also include any generic timers or system functions specific to a given OSD. In one embodiment, there is one CSR set, with several registers replicated per each OSD. The following table describes some of the CSR registers 606 of an embodiment. Mirrored registers map a single or global function/register into all OSD's. Note that in some cases the registers may be located in separate address locations to ensure that an OSD does not have to do Byte accesses or RMW.

| Register Name | Bits | Replicated/Mirrored | Function |
|---|---|---|---|
| INT Status | 16 | Replicated | Contains all INT Status |
| DMA Status | 16 | Replicated | Contains General status of DMA activity |
| RX CMD | 8 | Replicated | Initiates RX Descriptor Activity |
| TX CMD | 8 | Replicated | Initiates TX Descriptor Activity |
| Descriptor Location | 64 | Replicated | Base address for descriptor rings and general status pool in driver owned memory |
| Selective Reset | 4 | Replicated | Reset of various states of the chip |
| Pwr Mgt | 8 | Replicated | Status and control of Power Management Events and Packets |
| MDI Control | 32 | Replicated | Management bus access for PHY |
| TX Pointers | 16 | Replicated | Head/Tail pointers for TX descriptor |
| RX Pointers | 16 | Replicated | Head/Tail pointers for RX descriptor |
| General CFG | 32 | Replicated | General Configuration parameters |
| INT Timer | 16 | Replicated | Timer to moderate the number of INT's sent to a given OS domain |
| EEPROM R/W | 16 | Mirrored | Read and Write of EEPROM Data |
| General Status | 8 | Mirrored | Chip/Link wide status indications |
| RX-Byte Count | 32 | Mirrored | Byte count of RX FIFO status (Debug Only) |
| Flow Control | 16 | Mirrored | Status and CFG of MAC XON/XOFF |

Referring back to FIG. 6, coupled to the mux 604 is an EEPROM 608 having N MAC addresses 609. As mentioned above with respect to FIG. 5, a network interface controller is typically provided with one (or more) MAC addresses which associate the controller with a single OSD (e.g., one MAC address per network port). However, since the controller 600 will be associated with multiple OSD's, the manufacturer of the controller 600 will provide 1-N MAC addresses, depending on how many OSD's are supported by the controller 600, and how many ports per OSD are supported by the controller 600. For example, a controller 600 with 2 network ports (e.g., 1 gig and 10 gig), for each of 4 OSD's, would provide 8 MAC addresses. One skilled in the art will appreciate that the "N" designation for the number of DMA engines is thus not correlated to the "N" number of operating system domains supported by the controller 600. That is, the number of DMA engines is not directly associated with the number of OSD's supported.

The controller 600 further includes DMA logic having DMA arbitration 610 coupled to a number of DMA engines 611. Since the controller 600 will be supporting more than one OSD, additional DMA engines 611 allow increased performance for the controller 600, although additional DMA engines 611 are not required. Thus, one DMA engine 611 could be handling communication from a first OSD, while a second DMA engine 611 could be handling communication from a second OSD. Or, one DMA engine 611 could be handling transmit communication from a first OSD, while a second DMA engine 611 could be handling receive communication for the first OSD. Thus, it is not intended to necessarily provide a DMA engine 611 per supported OSD. Rather, the manufacturer may provide any number of DMA engines 611, according to the performance desired. Further, the DMA arbitration 610 may be configured to select/control utilization of the DMA engines 611 according to predefined criteria. One simple criteria would simply be a round robin selection of engines 611 by the supported OSD's. Another criteria would designate a DMA engine per OSD. Yet another criteria would associate particular DMA engines with either transmit or receive operations. Specifics associated with DMA arbitration are beyond the scope of the present application. However, one skilled in the art should appreciate that it is not the arbitration schemes which are important to the present application, but rather, the provision of 1-N DMA engines, along with appropriate arbitration, to allow for desired performance to be obtained for a desired number of supported OSD's.

The controller 600 further includes descriptor logic having descriptor arbitration 613, a plurality of descriptor caches 615, and in one embodiment descriptor tags 617. One skilled in the art will appreciate that present non shared network interface controllers contain a descriptor cache for storing transmit/receive descriptors. The transmit/receive descriptors are associated with the OSD to which the non shared controller is attached. The descriptors are retrieved by the non shared controller from the memory system of the OSD, and are used to receive/transmit data from/to the OSD. With the shared network interface controller 600 of the present invention, descriptors must be available within the controller 600 for each of the supported OSD's. And, each of the descriptors must be associated with their specific OSD. Applicant has envisioned a number of embodiments for providing descriptors for multiple OSD's, and has illustrated these embodiments in FIG. 8, to which attention is now directed.

Figure 8:
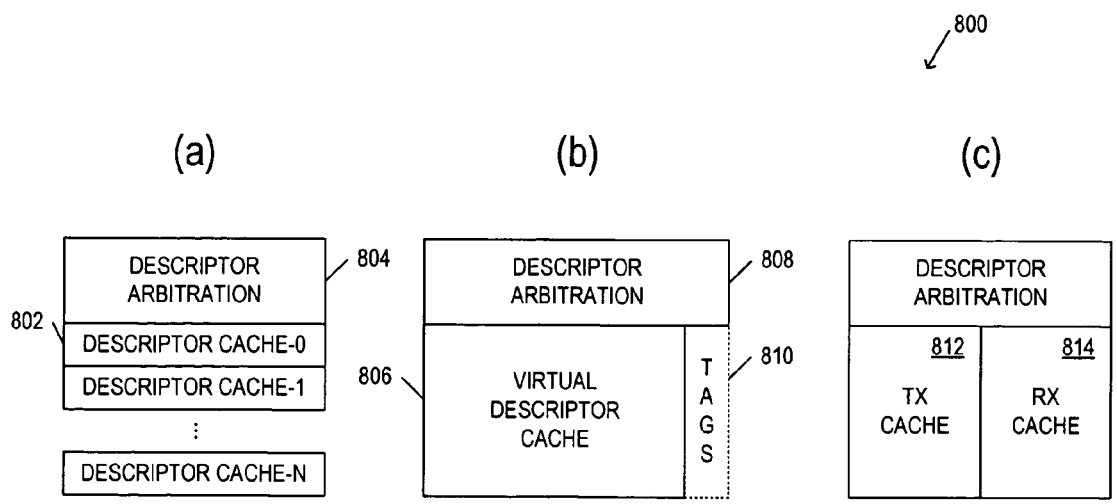
FIG. 8 is a block diagram of alternative embodiments of descriptor logic according to the present invention.

FIG. 8 provides three embodiments (a), (b), (c), 800 of descriptor cache arrangements for the controller 600. Embodiment (a) includes a plurality of descriptor caches 802 (1-N), thereby duplicating a descriptor cache of a non shared controller, and providing a descriptor cache for each supported OSD. In this embodiment, descriptors for OSD "0" would be stored in descriptor cache "0", descriptors for OSD "1" would be stored in descriptor cache "1", etc. Moreover, while not specifically illustrated, it should be appreciated that the descriptor caches 802 for each supported OSD include a transmit descriptor cache portion and a receive descriptor cache portion. These transmit/receive portions may be either the same size, or may be different in size, relative to each other. This embodiment would be easy to implement, but might require more on-controller memory than is desired.

Embodiment (b) includes a virtual descriptor cache 806 having tags 810. The virtual descriptor cache 806 may be used to store descriptors for any of the supported OSD's. But, when a descriptor is retrieved from a particular OSD, that OSD's header (or some other identifier) is placed as a tag which is associated with that descriptor. Thus, the controller can readily identify which of the descriptors in the virtual descriptor cache 806 are associated with which one of the supported OSD's. In this embodiment, descriptor arbitration 808 is used to insure that each supported OSD is adequately supported by the virtual descriptor cache 806. For example, the virtual descriptor cache 806 caches both transmit and receive descriptors for all of the supported OSD's. One scenario would allocate equal memory space to transmit descriptors and receive descriptors (such as shown in embodiment (c) discussed below. An alternative scenario would allocate a greater portion of the memory to transmit descriptors. Further, the allocation of memory to either transmit or receive descriptors could be made dynamic, so that a greater portion of the memory is used to store transmit descriptors, until the OSD's begin receiving a greater portion of receive packets, at which time a greater portion of the memory would be allocated for receive descriptors. And, the allocation of transmit receiver cache could be equal across all supported OSD's, or alternatively, could be based on pre-defined criteria. For example, it may be established that one or more of the OSD's should be given higher priority (or rights) to the descriptor cache. That is, OSD "0" might be allocated 30% of the transmit descriptor cache, while the other OSD's compete for the other 70%. Or, rights to the cache 806 may be made in a pure round-robin fashion, giving each OSD essentially equal rights to the cache for its descriptors. Thus, whether the allocation of fifo cache between transmit and receive descriptors, and/or between OSDs is made equal, or is made unequal based on static criteria, or is allowed to fluctuate based on dynamic criteria (e.g., statistics, timing, etc.), all such configurations are anticipated by the inventor.

One skilled in the art will appreciate that the design choices made with respect to descriptor size, and arbitration, is a result of trying to provide ready access to descriptors, both transmit and receive, for each supported OSD, while also trying to keep the cost of the controller 600 close to the cost of a non shared controller. Increasing the descriptor cache size impacts cost. Thus, descriptor arbitration schemes are used to best allocate the memory used to store the descriptors in a manner that optimizes performance. For example, if all of the descriptor memory is taken, and an OSD needs to obtain transmit descriptors to perform a transmit, a decision must be made to flush certain active descriptors in the cache. Which descriptors should be flushed? For which OSD? What has been described above are a number of descriptor arbitration models, which allow a designer to utilize static or dynamic criteria in allocating descriptor space, based on the type of descriptor and the OSD.

In embodiment (c), a virtual transmit descriptor cache 812 is provided to store transmit descriptors for the supported OSD's, and a virtual receive descriptor 814 is provided to store receive descriptors for the supported OSD's. This embodiment is essentially a specific implementation of embodiment (b) that prevents transmit descriptors for one OSD from overwriting active receive descriptors. Although not shown, it should be appreciated that tags for each of the descriptors are also stored within the transmit/received caches 812, 814, respectively.

What should be appreciated from the above is that for the shared network interface controller 600 to support multiple OSD's, memory/storage must be provided on the controller 600 for storing descriptors, and some mechanism should exist for associating the descriptors with their OSD. Three embodiments for accomplishing the association have been shown but others are possible without departing from the scope of the present invention.

Referring back to FIG. 6, the controller 600 further includes a processor 612 for executing controller instructions, and for managing the controller. And, the controller includes a buffer 619 coupled to transmit logic 616 and receive logic 620. The transmit logic performs transfer of data stored in the buffer 619 to the network. The receive logic 620 performs transfer of data from the network to the buffer 619. The buffer includes a virtual fifo 623 and a virtual fifo 625, managed by virtual fifo manager/buffer logic 621. The purpose of the buffer 619 is to buffer communication from the plurality of supported OSD's and the network. More specifically, the buffer 619 provides temporary storage for communication transferred from the OSD's to the controller 600, and for communication transferred from the network to the OSD's.

Figure 7:
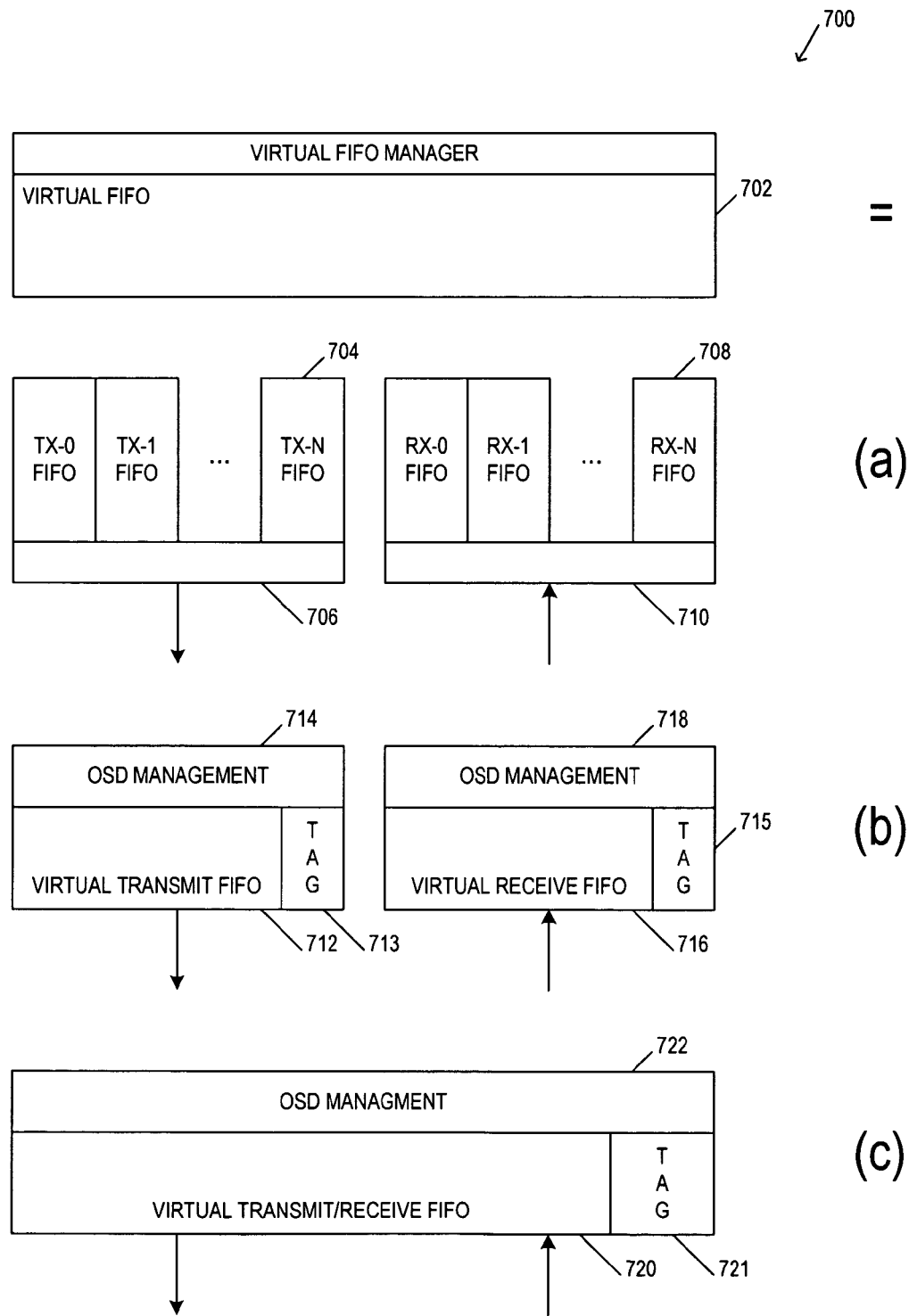
FIG. 7 is a block diagram of alternative embodiments of a transmit/receive fifo according to the present invention.

A number of embodiments for accomplishing such buffering are envisioned by the applicant, and are illustrated in FIG. 7 to which attention is now directed. More specifically, three embodiments (a), (b), (c) are shown which perform the necessary buffering function. Embodiment (a) includes 1-N transmit fifo's 704, and 1-N receive fifo's 708, coupled to transmit/receive logic 706/710 respectively. In this embodiment, a transmit fifo is provided for, and is associated with, each of the OSD's supported by the shared network controller 600. And, a receive fifo is provided for, and is associated with, each of the OSD's supported by the shared network controller 600. Thus, communication transmitted from OSD "0" is placed into transmit fifo "0", communication transmitted from OSD "1" is placed into transmit fifo "1" and communication to be transmitted to OSD "N" is placed into receive fifo "N". Since transmit/receive fifos 704, 708 are provided for each OSD, no tagging of data to OSD is required.

Embodiment (b) provides a virtual transmit fifo 712 and a virtual receive fifo 716, coupled to OSD management 714, 718, respectively. In addition, the transmit fifo 712 includes tag logic 713 for storing origin OSD tags (or destination MAC address information) for each packet within the fifo 712, and the receive fifo 716 includes tag logic 715 for storing destination OSD tags (or destination MAC address information) for each packet within the fifo 716. The virtual fifo's are capable of storing communication from/to any of the supported OSD's as long as the communication is tagged or associated with its origin/destination OSD. The purpose of the OSD management 714, 718 is to insure such association. Details of how communication gets associated with its OSD will be described below with reference back to FIG. 6.

Embodiment (c) provides a single virtual fifo 720, for buffering both transmit and receive communication for all of the supported OSD's, and tag logic 721 for storing tag information to associate transmit and receive communication with the supported OSD's, as explained with reference to embodiment (b). The single virtual fifo is coupled to OSD management 722, as above. The OSD management 722 tags each of the communications with their associated OSD, and indicates whether the communication is transmit or receive. One skilled in the art will appreciate that although three embodiments of transmit/receive fifo's are shown, others are possible. What is important is that the controller 600 provide buffering for transmit/receive packets for multiple OSD's, which associates each of the transmit/receive packets with their origin or destination OSD(s).

Referring back to FIG. 6, the controller 600 further includes association logic 622 having 1-N OSD entries 623, and 1-N MAC address entries 625. At configuration, for each of the OSD's that will be supported by the controller 600, at least one unique MAC address is assigned. The OSD/MAC association is stored in the association logic 622. In one embodiment, the association logic 622 is a look up table (LUT). The association logic 622 allows the controller 600 to associate transmit/receive packets with their origin/destination OSD. For example, when a receive packet comes into the controller 600 from the network, the destination MAC address of the packet is determined, and compared with the entries in the association logic 622. From the destination MAC address, the OSD(s) associated with that MAC address is determined. From this determination, the controller 600 can manage transfer of this packet to the appropriate OSD by placing its OSD header in the packet transferred from the controller 600 to shared I/O switch. The shared I/O switch will then use this OSD header to route the packet to the associated OSD.

The controller 600 further includes statistics logic 624. The statistics logic provides statistics, locally per OSD, and globally for the controller 600, for packets transmitted and received by the controller 600. For example, local statistics may include the number of packets transmitted and/or received per OSD, per network port. Global statistics may included the number of packets transmitted and/or received per network port, without regard to OSD. Further, as will be explained further below, it is important for loopback, broadcast, and multicast packets, to consider the statistics locally per OSD, and globally, as if such packets were being transmitted/received through non shared interface controllers. That is, a server to server communication through the shared network interface controller should have local statistics that look like X packets transmitted by a first OSD, and X packets received by a second OSD, even though as described below with reference to FIG. 12, such packets may never be transmitted outside the shared controller 600.

What has been described above is one embodiment of a shared network interface controller 600, having a number of logical blocks which provide support for transmitting/receiving packets to/from a network for multiple OSD's. To accomplish the support necessary for sharing the controller 600 among multiple OSD's, blocks which are considered OSD specific have been replicated or vitualized with tags to associate data with its OSD. Association logic has also been provided for mapping an OSD to one (or more) MAC addresses. Other embodiments which accomplish these purposes are also envisioned.

Further, one skilled in the art will appreciate that the logical blocks described with reference to FIG. 6, although shown as part of a single controller 600, may be physically placed into one or more distinct components. For example, the bus interface and OS ID logic 602 may be incorporated in another device, such as in the shared I/O switch described in FIG. 2. And, other aspects of the controller 600 (such as the replicated CSR's, descriptor cache(s), transmit/receive fifo's, etc. may be moved into another device, such as a network processor, or shared I/O switch, so that what is required in the network interface controller is relatively minimal. Thus, what should be appreciated from FIG. 6 is an arrangement of logical blocks for implementing sharing of an interface to a network, without regard to whether such arrangement is provided within a single component or chip, separate chips, or located disparately across multiple devices.

Figure 9:
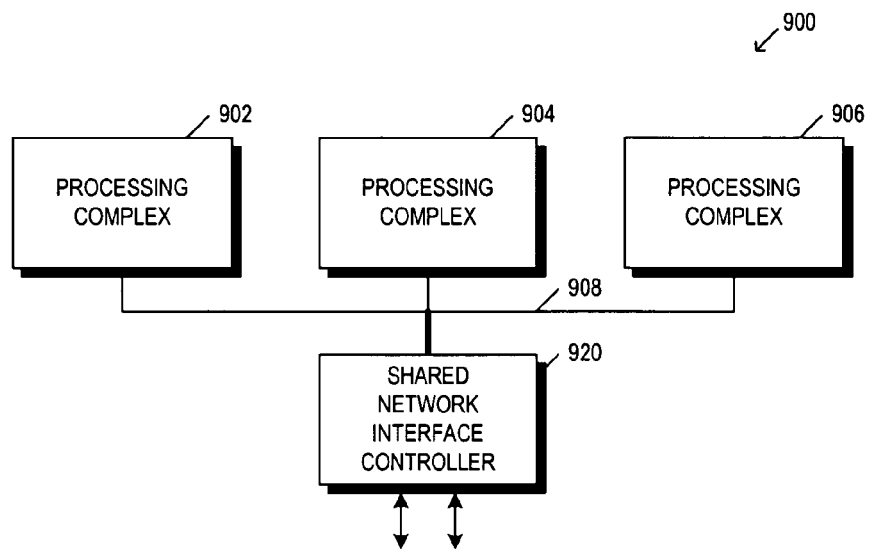
FIG. 9 is a block diagram illustrating three processing complexes coupled to a network interface controller which incorporates a shared I/O switch, according to the present invention.

Referring now to FIG. 9, a block diagram is shown of an alternative embodiment 900 of the present invention. More specifically, the processing complexes 902, 904, 906 are shown coupled directly to a shared network interface controller 920 via an OSD aware load-store bus 908. In this embodiment, each of the processing complexes 902, 904, 906 have incorporated OSD aware information in their load-store bus 908, so that they may be coupled directly to the shared network interface controller 920. Alternatively, the load-store bus 908 is not OSD aware, but rather, the shared network interface controller 920 incorporates a shared I/O switch within the controller, and has at least three upstream ports for coupling the controller 920 to the processing complexes. Such an embodiment is particularly shown in FIG. 10 to which attention is now directed.

Figure 10:
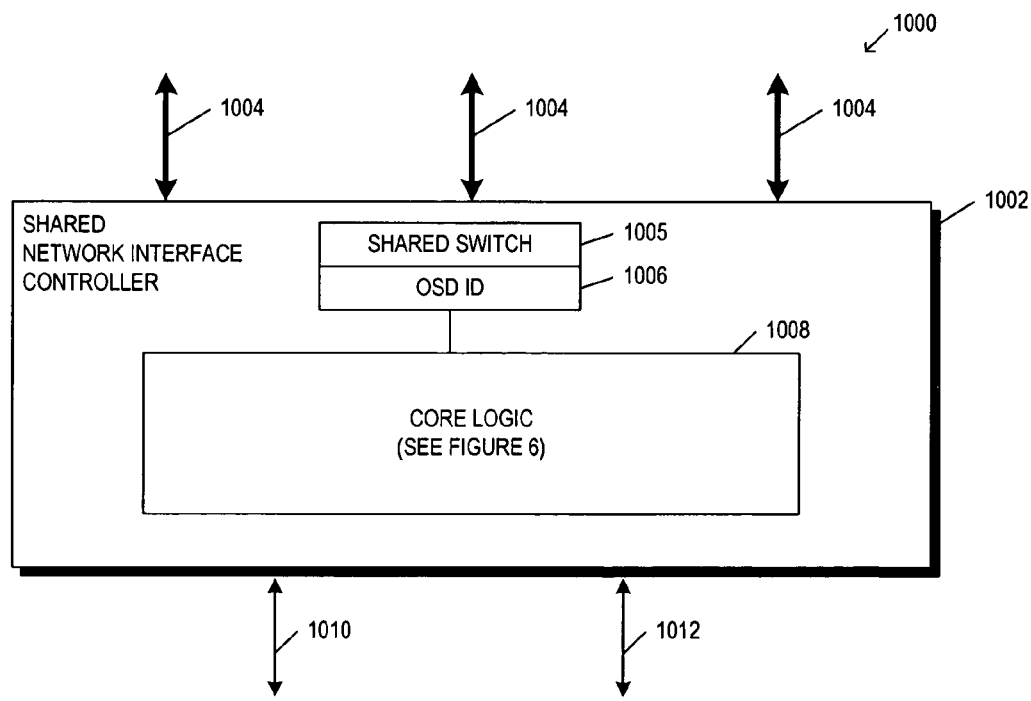
FIG. 10 is a block diagram illustrating the shared network interface controller of FIG. 9.

FIG. 10 illustrates a shared network interface controller 1002 having three load-store buses 1004 for coupling the controller 1002 to upstream processing complexes. In this embodiment, the load-store buses 1004 are not OSD aware. The controller 1002 contains a shared i/o switch 1005, and OSD ID logic 1006 for associating communication from/to each of the processing complexes with an OS identifier. The OSD ID logic 1006 is coupled via an OS aware link to core logic 1008, similar to that described above with respect to FIG. 6. Applicant intends to illustrate in these Figures that the shared network interface controller of the present invention may be incorporated within a shared I/O switch, or may incorporate a shared I/O switch within it, or may be coupled directly to OSD aware processing complexes. Any of these scenarios are within the scope of the present invention.

Figure 11:
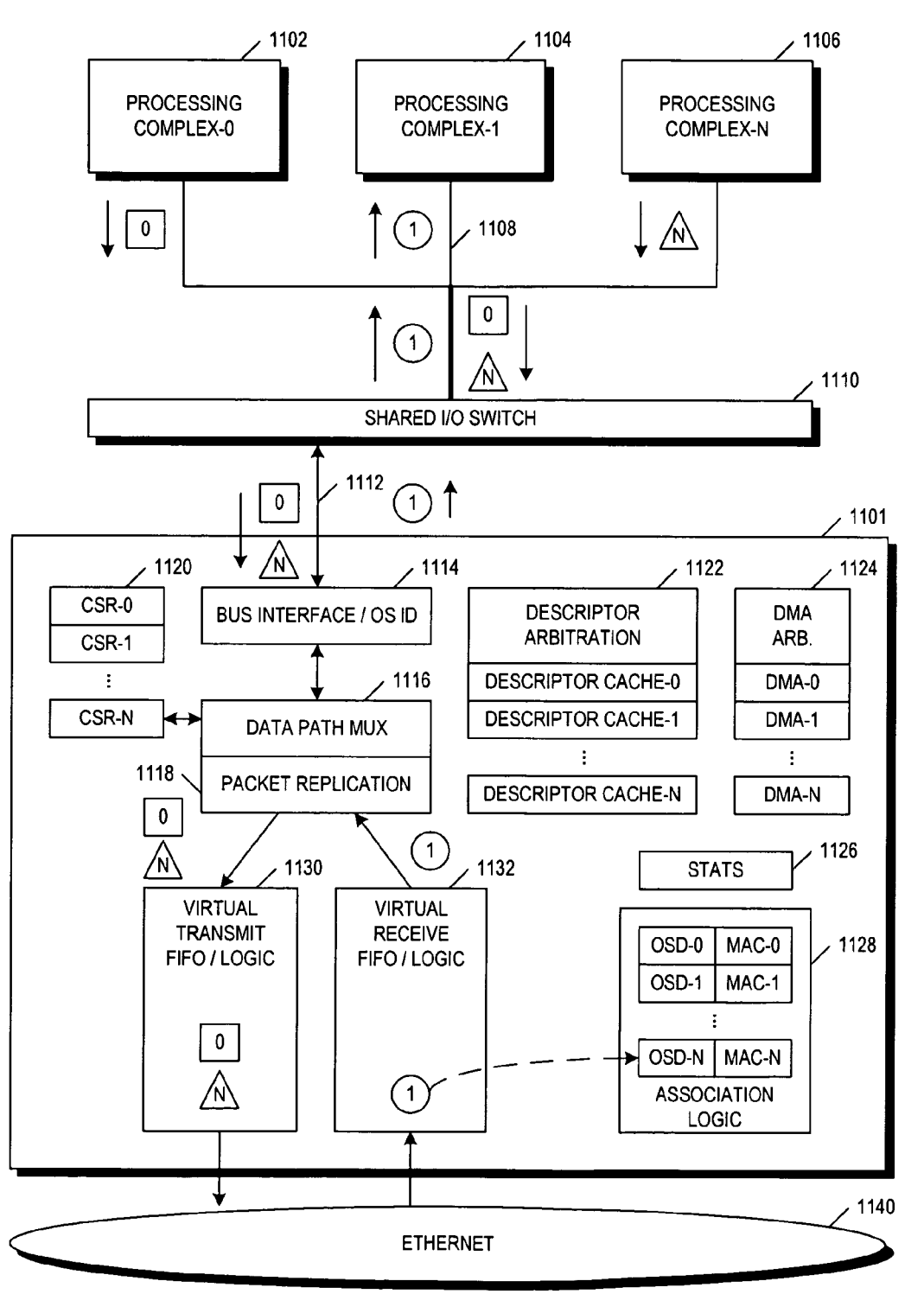
FIG. 11 is a block diagram illustrating packet flow through the shared network interface controller according to the present invention.

Referring now to FIG. 11, a block diagram 1100 is shown which illustrates packet flow through the shared network interface controller of the present invention. More specifically, processing complexes 1102, 1104, 1106 (designated as "0", "1", "N" to indicate 1-N supported processing complexes) are coupled via a non OSD aware load-store link 1108 to a shared I/O switch 1110. The switch 1110 is coupled to a shared network interface controller 1101 similar to that described with reference to FIG. 6. The controller 1101 is coupled to a network 1140 such as Ethernet. With respect to FIGS. 11-13, packets originating from or destined for processing complex 1102 ("0") are illustrated inside a square, with the notation "0". Packets originating from or destined for processing complex 1104 ("1") are illustrated inside a circle, with the notation "1". Packets originating from or destined for processing complex 1106 ("N") are illustrated inside a triangle, with the notation "N". In this example, each of the packets "0", "1", and "N" are unicast packets. Flow will now be described illustrating transmit packets "0" and "N" from processing complexes 1102, 1106 respectively, and receive packet "1" to processing complex 1104, through the shared network interface controller 1101.

At some point in time, processing complex 1102 alerts the controller 1101 that it has packet "0" in its memory, and requires that it be transferred to the network. Typically, this is accomplished by writing into a head pointer within the CSR 1120 associated with that processing complex 1102. The controller 1101 will arbitrate for one of the dma engines 1124 to dma the descriptors associated with the packet into its descriptor cache 1122. The controller will then use the descriptors, and initiates a dma of the packet into its virtual transmit fifo 1130. When the packet is placed into the fifo 1130, a tag indicating the OSD origin of the packet is placed into the fifo 1130 along with the packet.

At another point in time, processing complex 1106 alerts the controller 1101 that it has packet "N" in its memory, and requires that it be transferred to the network. The controller 1101 obtains the descriptors for packet "N" similar to above, and then dma's the packet into the fifo 1130.

As shown, the packets arrive in the order "N", then "0", and are placed into the fifo 1130 in that order. The packets are then transmitted to the network 1140.

Also, at some point in time, packet "1" is received from the network 1140 and is placed into the receive fifo 1132. Upon receipt, the destination MAC address of the packet is looked up in the association logic 1128 to determine which OSD corresponds to the packet. In this case, processing complex 1104 ("1") is associated with the packet, and the packet is tagged as such within the fifo 1132. Once the packet is in the fifo 1132, the controller 1101 determines whether receive descriptors exist in the descriptor cache 1122 for processing complex 1104. If so, it uses these descriptors to initiate a dma of the packet from the controller 1101 to processing complex 1104. If the descriptors do not exist, the controller 1101 obtains receive descriptors from processing complex 1104, then dma's the packet to processing complex 1104 to the memory locations specified by the descriptors. Communication to the processing complex 1104 from the controller 1101 contains OSD header information, specifically designating to the shared I/O switch 1110 which of its upstream processing complexes 1102, 1104, 1106 the communication is intended.

The description above with respect to FIG. 11 provides a general understanding of how transmit/receive packets flow between the processing complexes and the network. Packet flow will now be described with respect to a multicast transmit packet. One skilled in the art will appreciate that a multicast packet is a packet tagged as such in the packet header, and thus determined to be a multicast packet when the packet is received, either from an originating OSD, or from the network. The multicast packet is compared against filters (perfect and hash filters being the most common), and virtual lans (VLAN's), that are established by the driver, and maintained per OSD, to determine if the packet is destined for any of the OSD's supported by the shared controller.

Figure 12:
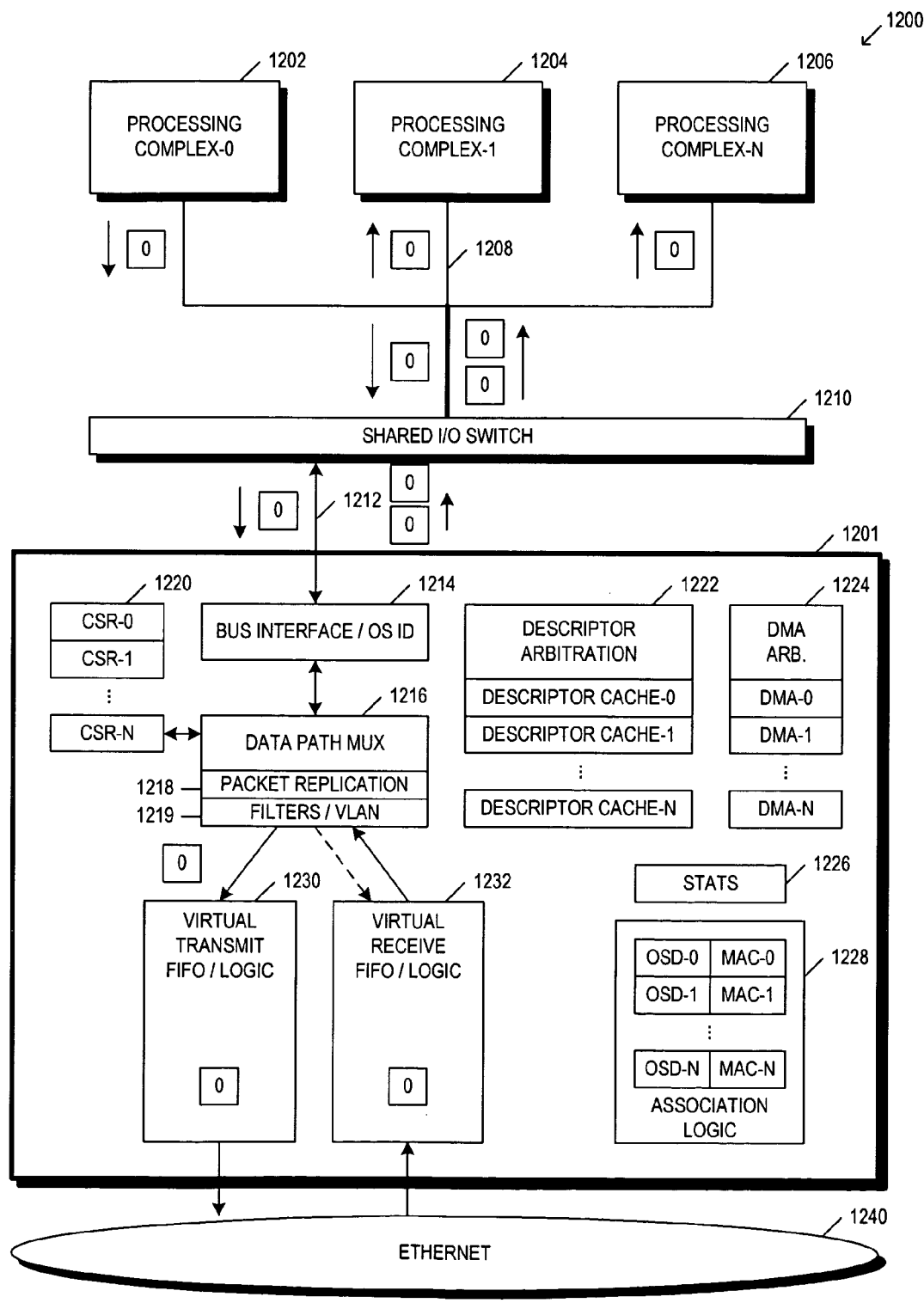
FIG. 12 is a block diagram illustrating packet flow for a multicast transmit operation through the shared network interface controller according to the present invention.

Referring now to FIG. 12, a block diagram similar to that described above with respect to FIG. 11 is shown, reference elements being the same, the hundreds digits replaced with a 12. In addition, the perfect/hash filters, and VLAN logic (per OSD) 1219 is shown included within the replication logic 1218. In this case, a transmit packet "0" originates from processing complex 1202. The processing complex 1202 alerts the controller 1201 of the packet by writing to CSR block 1220. The controller 1201 arbitrates for a dma engine 1224, and dma's a descriptor to the descriptor cache 1222. The controller 1201 uses the descriptor to dma packet "0" from processing complex 1202 to the data path mux 1216. When the packet arrives it is examined to determine its destination MAC address. A lookup into the association logic 1228 is made to determine whether the destination MAC address includes any of the MAC addresses for which the controller 1201 is responsible. If not, then the packet is placed into the transmit fifo 1230 for transfer to the network 1240. Alternatively, if the lookup into the association logic 1228 determines that the destination MAC ADDRESS is one of the addresses for which the controller 1201 is responsible, packet replication logic 1218 causes the packet to be written into the receive fifo 1232 instead of the transmit fifo 1230. In addition, the packet is tagged within the fifo 1232 with the OSD corresponding to the destination MAC address. This causes the controller 1201 to treat this packet as a receive packet, thereby initiating transfer of the packet to it associated processing complex.

In the example illustrated in FIG. 12, packet "0" is a multicast packet, with header information which must be compared to the filters/vlan logic 1218 per OSD to determine whether it should be destined for other OSD's supported by the controller. In this instance, packet "0" is destined for processing complexes 1204, 1206, and a device on the network 1240. Thus, packet "0" is written into the transmit fifo 1230 to be transferred to the network 1240. And, packet "0" is written into the receive fifo 1232 to be transferred to processing complex 1204. Once packet "0" has been transferred to processing complex 1204, packet replication logic 1218, in combination with the filter/vlan logic 1219 determines that the packet is also destined for processing complex 1206. Thus, rather than deleting packet "0" from the receive fifo 1232, packet replication logic 1218 retains the packet in the fifo 1232 and initiates a transfer of the packet to processing complex 1206. Once this transfer is complete, packet "0" is cleared from the fifo 1232. One skilled in the art should appreciate that packet "0" could have been a unicast packet from processing complex 1202 to processing complex 1204 (or 1206). In such instance, packet replication logic 1218 would have determined, using the destination MAC address in packet "0", that the destination OSD was either processing complex 1204 or 1206. In such instance, rather than writing packet "0" into the transmit fifo 1230, it would have written it directly into receive fifo 1232. Processing complex 1204 (or 1206) would have then been notified that a packet had been received for it. In this case, packet "0" would not ever leave the shared controller 1201, and, no double buffering would have been required for packet "0" (i.e., on both the transmit and receive side). One skilled in the art should also appreciate that the statistics recorded for such a loopback packet should accurately reflect the packet transmit from processing complex 1202 and the packet receive to processing complex 1204 (or 1206) even though packet "0" never left the shared controller 1201, or even hit the transmit fifo 1230.

The above example is provided to illustrate that packets transmitted by any one of the supported processing complexes may be destined for one of the other processing complexes connected to the shared controller 1201. If this is the case, it would be inappropriate (at least within an Ethernet network) to present such a packet onto the network 1140, since it will not be returned. Thus, the controller 1201 has been designed to detect, using the destination MAC address, and the association logic 1228, whether any transmit packet is destined for one of the other processing complexes. And, if such is the case, packet replication logic causes the packet to be placed into the receive fifo 1232, to get the packet to the correct processing complex(es).

Figure 13:
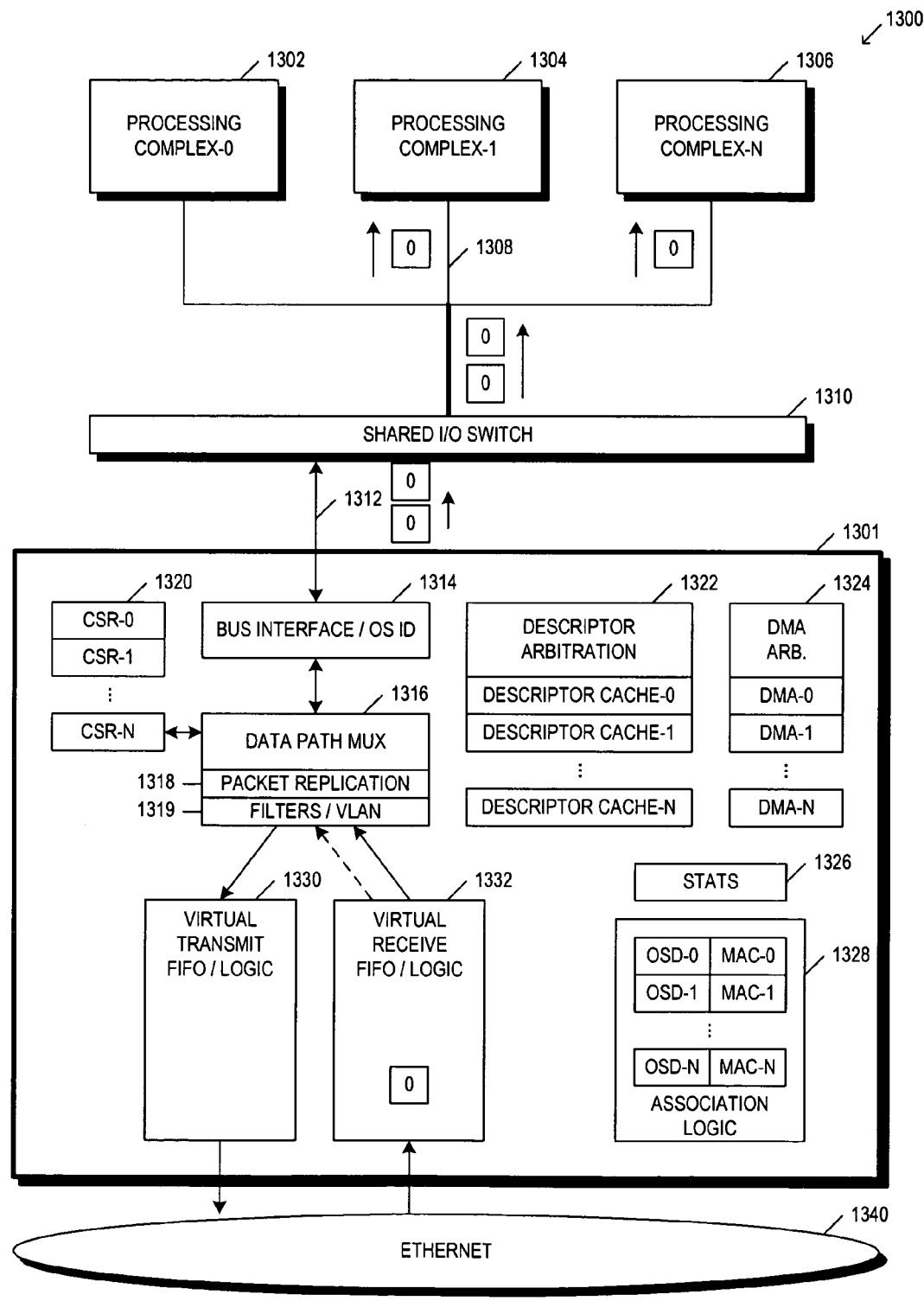
FIG. 13 is a block diagram of illustrating packet flow for a multicast receive operation through the shared network interface controller according to the present invention.

Referring now to FIG. 13, a block diagram 1300 is shown illustrating receipt of a multicast packet from the network 1340. Diagram 1300 is similar to FIGS. 11 and 12, with references the same, the hundreds digits replaced with 13. In this instance, packet "0" is received into the receive fifo 1332. The destination MAC addresse for the packet is read and compared to the entries in the association logic 1328. Further, the packet is determined to be a multicast packet. Thus, filters (perfect and hash) and VLAN tables 1319 are examined to determine which, if any, of the OSD's are part of the multicast. The packet is tagged with OSD's designating the appropriate upstream processing complexes. In this instance, packet "0" is destined for processing complexes 1304, 1306. The controller 1301 therefore causes packet "0" to be transferred to processing complex 1304 as above. Once complete, the controller 1301 causes packet "0" to be transferred to processing complex 1306. Once complete, packet "0" is cleared from receive fifo 1332.

Each of the above packet flows, with respect to FIGS. 11-13, have been simplified by showing no more than three upstream processing complexes, and no more than 3 packets at a time, for which transmit/receive operations must occur. However, as mentioned above, applicant envisions the shared network interface controller of the present invention to support from 1 to N processing complexes, with N being some number greater than 16. The shared I/O switch that has been repeatedly referred to has been described in considerable detail in the parent applications referenced above. Cascading of the shared I/O switch allows for at least 16 upstream processing complexes to be uniquely defined and tracked within the load-store architecture described. It is envisioned that the shared network interface controller can support at least this number of processing complexes, but there is no need to limit such number to 16. Further, the number of packets that may be transmitted/received by the shared network interface controller within a given period of time is limited only by the bandwidth of the load-store link, or the bandwidth of the network connection. As long as resources exist within the shared network interface controller appropriate to each supported processing complex (e.g., descriptor cache, CSR's, etc.), and association logic exists to correlate processing complexes with physical MAC addresses, and data within the controller may be associated with one or more of the processing complexes, the objectives of the present invention have been met, regardless of the number of processing complexes supported, the details of the resources provided, or the physical links provided either to the load-store link, or the network.

Figure 18:
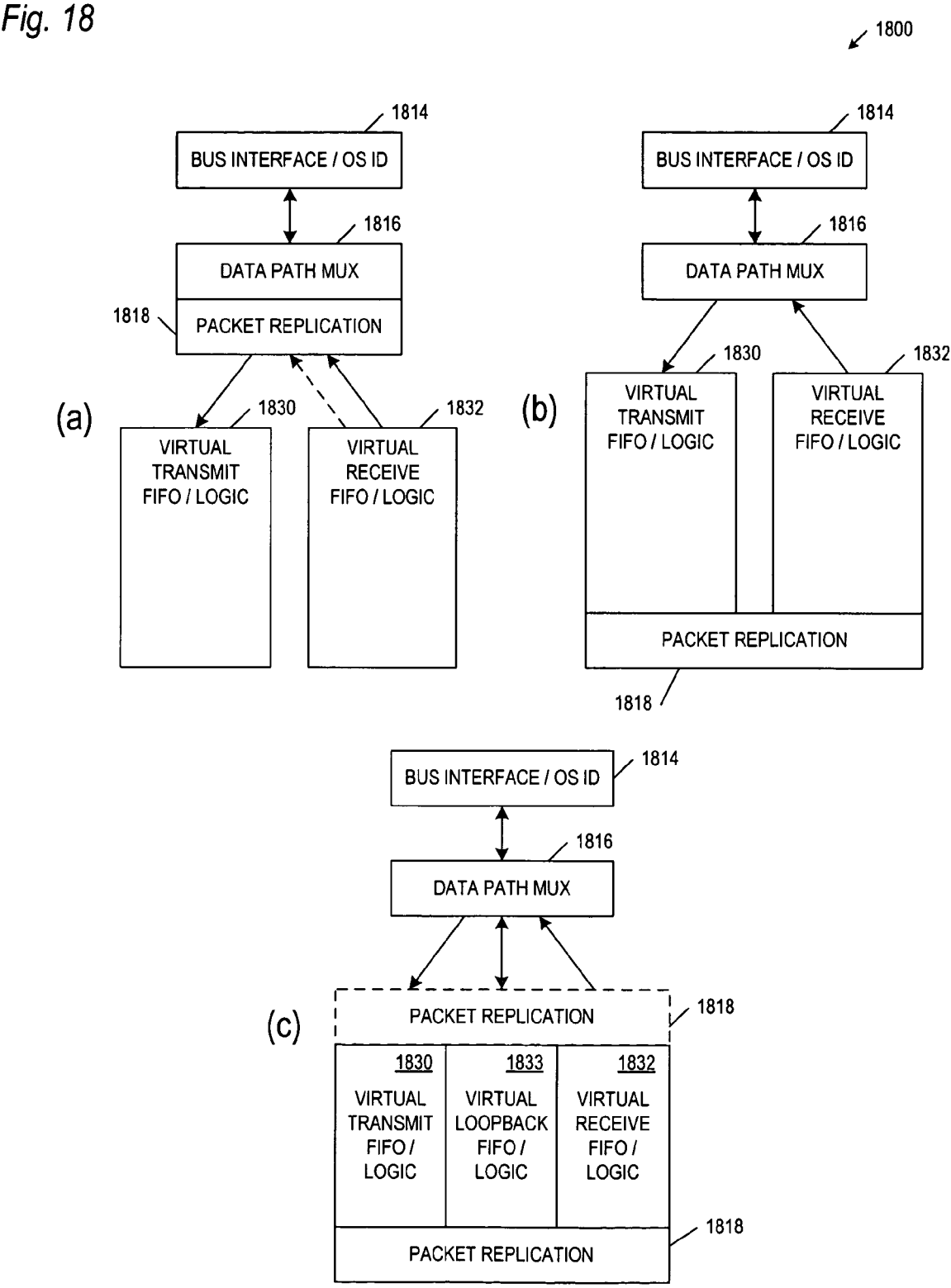
FIG. 18 is a block diagram illustrating alternative embodiments of packet replication logic and loopback detection according to the present invention.

Referring now to FIG. 18, three embodiments of a loopback mechanism 1800 according to the present invention are shown. More specifically, the above discussion with reference to FIGS. 12 and 13 illustrated a feature of the present invention which prevents packets originating from one of the OSD's supported by the shared controller 600 and destinated for another one of the OSD's supported by the shared controller 600, from entering the network. This feature is termed "loopback". In operation, the shared controller 600 detects, for any packet transmitted from an OSD, whether the packet is destined for another one of the OSD's supported by the controller. As described with reference to FIG. 12, packet replication logic 1218 makes this determination, by comparing the destination MAC address in the packet with its corresponding OSD provided by the association logic 1228. This is merely one embodiment of accomplishing the purpose of preventing a packet destined for another one of the OSD's from entering the network. Other embodiments are envisioned by the inventor. For example, in embodiment (a) shown in FIG. 18, packet replication logic 1818 is located between the bus interface 1814 and the transmit receive fifo's 1830 and 1832. However, in this embodiment, a modification in the controller's driver (loaded by each OSD) requires that the driver specify the destination MAC address for a packet within the transmit descriptor. Thus, when a transmit descriptor is downloaded into the controller 600, the packet replication logic 1818 can examine the descriptor to determine whether the packet will require loopback, prior to downloading the packet. If this is determined, the location for the loopback packet, whether in the transmit fifo, or the receive fifo, is made prior to transfer, and indicated to the appropriate DMA engine.

In an alternative embodiment (b), the replication logic 1818 is placed between the transmit/receive fifo's 1830, 1832 and the transmit/receive logic. Thus, a loopback packet is allowed to be transferred from an OSD into the transmit fifo 1830. Once it is in the transmit fifo 1830, a determination is made that its destination MAC address corresponds to one of the OSD's supported by the controller. Thus, packet replication logic 1818 causes the packet to be transferred into the receive fifo 1832 for later transfer to the destination OSD.

In yet another embodiment (c), the replication logic 1818 is placed either between the fifo's and the transmit/receive logic, or between the bus interface 1814 and the fifo's 1830, 1832. In either case, a loopback fifo 1833 is provided as a separate buffer for loopback packets. The loopback fifo 1833 can be used to store loopback packets, regardless of when the loopback condition is determined (i.e., before transfer from the OSD; or after transfer into the transmit fifo 1830).

What should be appreciated from the above discussion is that a number of implementations exist to detect whether a transmit packet from one OSD has as its destination any of the other OSD's supported by the shared controller. As long as the controller detects such an event (a "loopback"), and forwards the packet to the appropriate destination OSD(s), the shared controller has efficiently, and effectively communicated the packet accurately.

Figure 14:
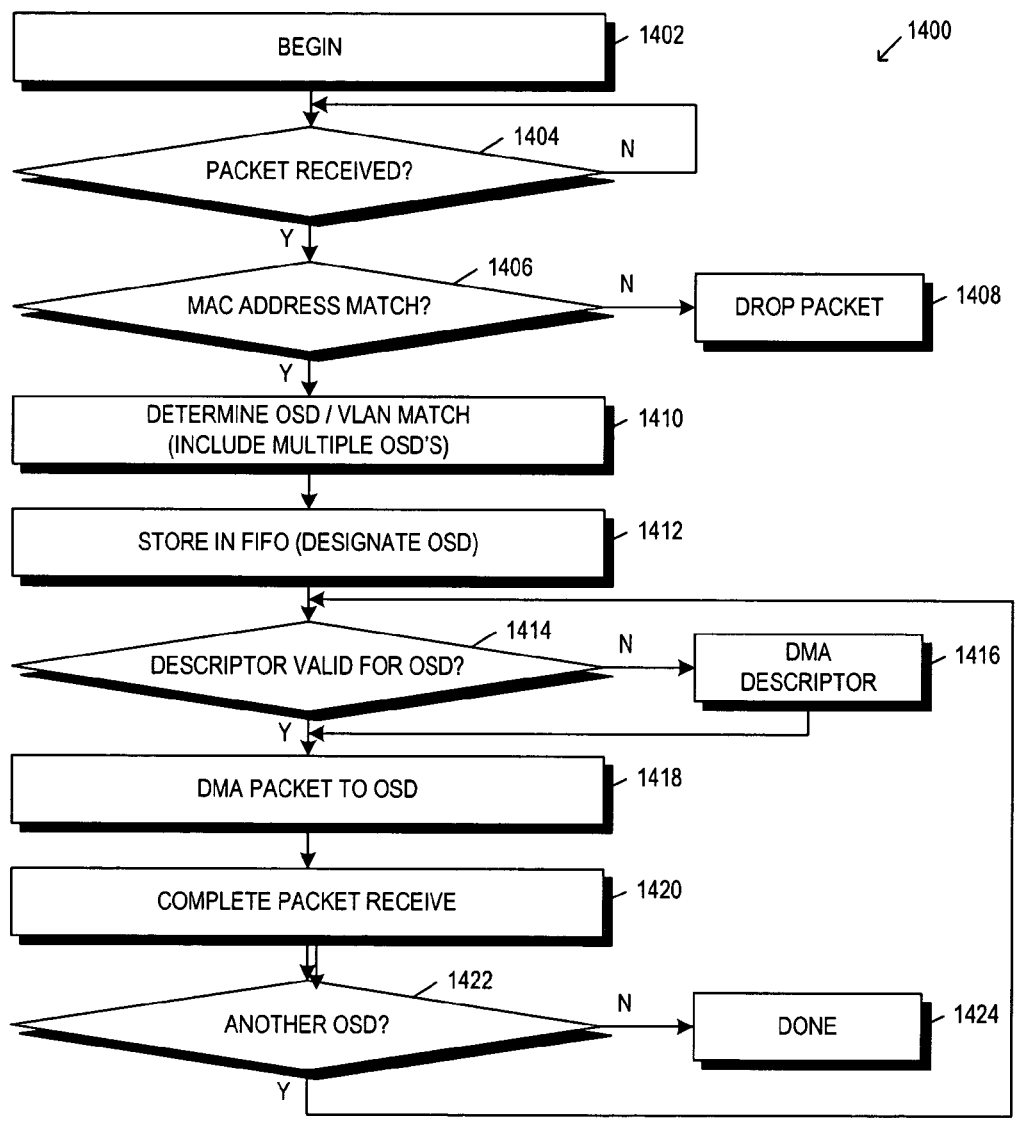
FIG. 14 is a flow chart illustrating a packet receive through the shared network interface controller of the present invention.

Referring now to FIG. 14, a flow chart 1400 is shown illustrating the method of the present invention when a packet is received by the network interface controller. Flow begins at block 1402 and proceeds to decision block 1404.

At decision block 1404, a determination is made as to whether a packet has been received. If not, flow proceeds back to decision block 1404. If a packet has been received, flow proceeds to decision block 1406. In an alternative embodiment, a determination is made as to whether the header portion of a packet has been received. That is, once the header portion of a packet is received, it is possible to associate the destination MAC address with one (or more) OSD's, without waiting for the packet to be completely received.

At decision block 1406, a determination is made as to whether the destination MAC address of the packet matches any of the MAC addresses for which the controller is responsible. If not, flow proceeds to block 1408 where the packet is dropped. However, if a match exists, flow proceeds to block 1410.

At block 1410, association logic is consulted to determine which OSD's correspond to the destination MAC addresses referenced in the received packet. A further determination is made as to whether the MAC addresses correspond to particular virtual lans (VLAN's) for a particular OSD. Flow then proceeds to block 1412.

At block 1412, the packet is stored in the receive fifo, and designating with its appropriate OSD(s). Flow then proceeds to decision block 1414.

At decision block 1414, a determination is made as to whether the controller contains a valid receive descriptor for the designated OSD. If not, flow proceeds to block 1416 where the controller retrieves a valid receive descriptor from the designated OSD, and returns flow to block 1418. If the controller already has a valid receive descriptor for the designated OSD, flow proceeds to block 1418.

At block 1418, the packet begins transfer to the designated OSD (via the shared I/O switch). Flow then proceeds to block 1420.

At block 1420, packet transfer is completed. Flow then proceeds to decision block 1422.

At decision block 1422, a determination is made as to whether the packet is destined for another OSD. If not, flow proceeds to block 1424 where the method completes. But, if the packet is destined for another OSD, flow returns to decision block 1414 for that designated OSD. This flow continues for all designated OSD's.

Figure 15:
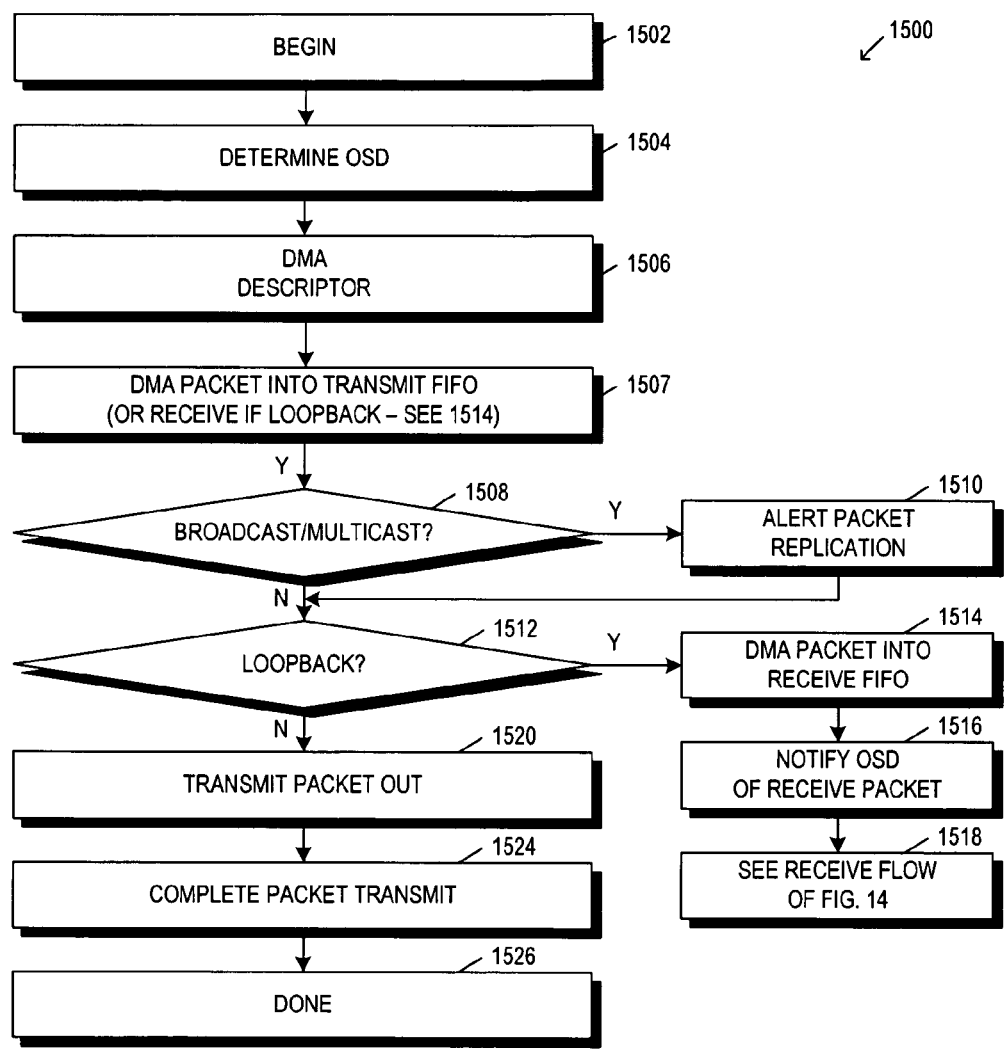
FIG. 15 is a flow chart illustrating a packet transmit through the shared network interface controller of the present invention.

Referring now to FIG. 15, a flow chart 1500 is shown illustrating the method of the present invention for transmit of a packet through the shared network interface controller of the present invention.

Flow begins at block 1502 and proceeds to block 1504.

At block 1504, a determination is made as to which OSD is transmitting the packet. Flow then proceeds to block 1506.

At block 1506, a valid transmit descriptor for the transmit OSD is obtained from the OSD. Flow then proceeds to block 1507.

At block 1507, the packet is dma'ed into the transmit fifo. Flow then proceeds to decision block 1508. Note, as discussed above, in one embodiment, the OSD places the destination MAC address within the descriptor to allow the packet replication logic to determine whether a loopback condition exists, prior to transferring the packet into the transmit fifo. In an alternative embodiment, the OSD does not do the copy, so the shared controller does not associate a packet with loopback until the first part of the header has been read from the OSD. In either case, the loopback condition is determined prior to block 1520. If the destination MAC address (and/or an indication of broadcast or multicast) is sent with the descriptor, the packet replication logic can determine whether a loopback condition exists, and can therefore steer the dma engine to transfer the packet directly into the receive fifo. Alternatively, if the descriptor does not contain the destination MAC address (for loopback determination), then a determination of loopback cannot be made until the packet header comes into the controller. In this instance, the packet header could be examined while in the bus interface, to alert the packet replication logic whether to steer the packet into the transmit fifo, or into the receive fifo. Alternatively, the packet could simply be stored into the transmit fifo, and await for packet replication logic to determine whether a loopback condition exists.

At decision block 1508 a determination is made as to whether the transmit packet is either a broadcast or a multicast packet. If the packet is either a broadcast or multicast packet, flow proceeds to block 1510 where packet replication is notified. In one embodiment, packet replication is responsible for managing packet transfer to multiple MAC addresses by tagging the packet with information corresponding to each destination OSD, and for insuring that the packet is transmitted to each destination OSD. While not shown, one implementation utilizes a bit-wise OSD tag (i.e., one bit per supported OSD), such that an eight bit tag could reference eight possible OSD destinations for a packet. Of course, any manner of designating OSD destinations for a packet may be used without departing from the scope of the present invention. Once the tagging of the packet for destination OSD's is performed, flow proceeds to decision block 1512.

At decision block 1512, a determination is made as to whether the transmit packet is a loopback packet. As mentioned above, on an Ethernet network, a network interface controller may not transmit a packet which is ultimately destined for one of the devices it supports. In non shared controllers, this is never the case (unless an OSD is trying to transmit packets to itself). But, in a shared controller, it is likely that for server to server communications, a transfer packet is presented to the controller for a destination MAC address that is within the realm of responsibility of the controller. This is called a loopback packet. Thus, the controller examines the destination MAC address of the packet to determine whether the destination is for one of the OSD's for which the controller is responsible. If not, flow proceeds to block 1520. However, if the packet is a loopback packet, flow proceeds to block 1514.

At block 1514, the packet is transferred to the receive fifo rather than the transmit fifo. Flow then proceeds to block 1516.

At block 1516, the destination OSD is notified that a packet has been received for it. In one embodiment this requires CSR's for the destination OSD to be updated. Flow then proceeds to block 1518.

At block 1518, flow proceeds to the flow chart of FIG. 14 where flow of a receive packet was described.

At block 1520, the packet is transferred to the transmit fifo. Flow then proceeds to block 1522.

At block 1522, the packet is transmitted out to the network. Flow then proceeds to block 1524.

At block 1524, packet transmit is completed. Flow then proceeds to block 1526 where the method completes.

Figure 16:
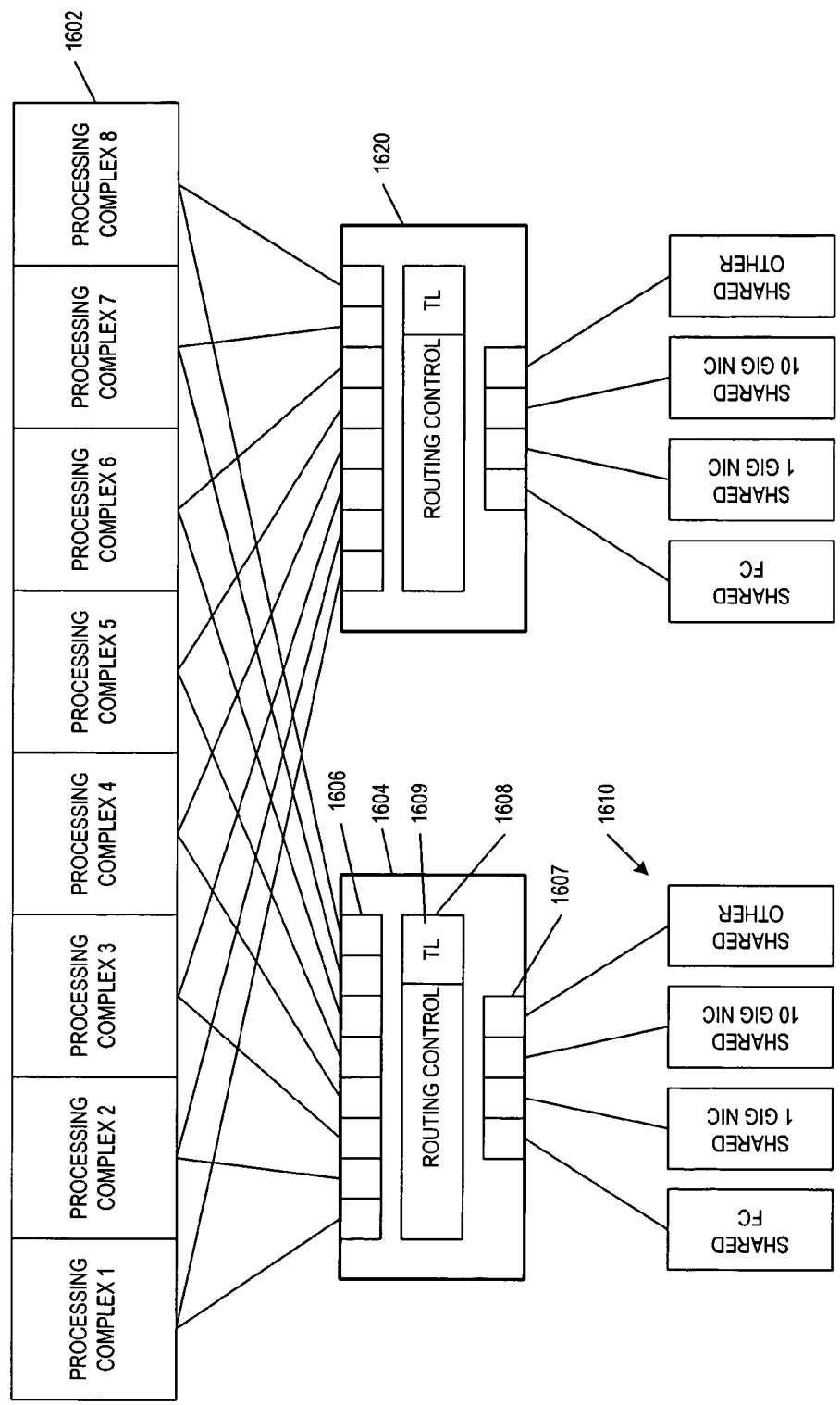
FIG. 16 is a block diagram of a redundant 8 blade server architecture utilizing shared I/O switches and endpoints according to the present invention.

Referring now to FIG. 16, a block diagram 1600 is shown which illustrates eight processing complexes 1602 which share four shared I/O controllers 1610 utilizing the features of the present invention. In one embodiment, the eight processing complexes 1602 are coupled directly to eight upstream ports 1606 on shared I/O switch 1604. The shared I/O switch 1604 is also coupled to the shared I/O controllers 1610 via four downstream ports 1607. In one embodiment, the upstream ports 1606 are PCI Express ports, and the downstream ports 1607 are PCI Express+ ports, although other embodiments might utilize PCI Express+ ports for every port within the switch 1604. Routing Control logic 1608, along with table lookup 1609 is provided within the shared I/O switch 1604 to determine which ports packets should be transferred to.

Also shown in FIG. 16 is a second shared I/O switch 1620 which is identical to that of shared I/O switch 1604. Shared I/O switch 1620 is also coupled to each of the processing complexes 1602 to provide redundancy of I/O for the processing complexes 1602. That is, if a shared I/O controller 1610 coupled to the shared I/O switch 1604 goes down, the shared I/O switch 1620 can continue to service the processing complexes 1602 using the shared I/O controllers that are attached to it. One skilled in the art will appreciate that among the shared I/O controllers 1610 shown are a shared network interface controller according to the present invention.

While not particularly shown, one skilled in the art will appreciate that many alternative embodiments may be implemented which differ from the above description, while not departing from the scope of the invention as claimed. For example, the context of the processing complexes, i.e., the environment in which they are placed has not been described because such discussion is exhaustively provided in the parent application(s). However, one skilled in the art will appreciate that the processing complexes (or operating system domains) of the present application should be read to include at least one or more processor cores within a SOC, or one or more processors within a board level system, whether the system is a desktop, server or blade. Moreover, the location of the shared I/O switch, whether placed within an SOC, on the backplane of a blade enclosure, or within a shared network interface controller should not be controlling. Rather, it is the provision of a network interfacecontroller which can process transmits/receives for multiple processing complexes, as part of their load-store domain, to which the present invention is directed. This is true whether the OSD ID logic is within the shared network interface controller, or whether the shared network interface controller provides multiple upstream OSD aware (or non OSD aware) ports. Further, it is the tracking of outstanding transmits/receives such that the transmits/receives are accurately associated with their upstream links (or OSD's) that is important.

Additionally, the above discussion has described the present invention within the context of three processing complexes communicating with the shared network interface controller. The choice of three processing complexes was simply for purposes of illustration. The present invention could be utilized in any environment that has one or more processing complexes (servers, CPU's, etc.) that require access to a network.

Further, the present invention has utilized a shared I/O switch to associate and route packets from processing complexes to the shared network interface controller. It is within the scope of the present invention to incorporate the features of the present invention within a processing complex (or chipset) such that everything downstream of the processing complex is shared I/O aware (e.g., PCI Express+). If this were the case, the shared network interface controller could be coupled directly to ports on a processing complex, as long as the ports on the processing complex provided shared I/O information to the shared network interface controller, such as OS Domain information. What is important is that the shared network interface controller be able to recognize and associate packets with origin or upstream OS Domains, whether or not a shared I/O switch is placed external to the processing complexes, or resides within the processing complexes themselves.

And, if the shared I/O switch were incorporated within the processing complex, it is also possible to incorporate one or more shared network interface controllers into the processing complex. This would allow a single processing complex to support multiple upstream OS Domains while packaging everything necessary to talk to fabrics outside of the load/store domain (Ethernet, Fiber Channel, SATA, etc.) within the processing complex. Further, if the upstream OS Domains were made shared I/O aware, it is also possible to couple the domains directly to the network interface controllers, all within the processing complex.

And, it is envisioned that multiple shared I/O switches according to the present invention be cascaded to allow many variations of interconnecting processing complexes with downstream I/O devices such as the shared network interface controller. In such a cascaded scenario, an OS Header may be global, or it might be local. That is, it is possible that a local ID be placed within an OS Header, the local ID particularly identifying a packet, within a given link (e.g., between a processing complex and a switch, between a switch and a switch, and/or between a switch and an endpoint). So, a local ID may exist between a downstream shared I/O switch and an endpoint, while a different local ID may be used between an upstream shared I/O switch and the downstream shared I/O switch, and yet another local ID between an upstream shared I/O switch and a root complex. In this scenario, each of the switches would be responsible for mapping packets from one port to another, and rebuilding packets to appropriately identify the packets with their associating upstream/downstream port.

It is also envisioned that the addition of an OSD header within a load-store fabric, as described above, could be further encapsulated within another load-store fabric yet to be developed, or could be further encapsulated, tunneled, or embedded within a channel-based fabric such as Advanced Switching (AS) or Ethernet. AS is a multi-point, peer-to-peer switched interconnect architecture that is governed by a core AS specification along with a series of companion specifications that define protocol encapsulations that are to be tunneled through AS fabrics. These specifications are controlled by the Advanced Switching Interface Special Interest Group (ASI-SIG), 5440 SW Westgate Drive, Suite 217, Portland, Oreg. 97221 (Phone: 503-291-2566). For example, within an AS embodiment, the present invention contemplates employing an existing AS header that specifically defines a packet path through a I/O switch according to the present invention. Regardless of the fabric used downstream from the OS domain (or root complex), the inventors consider any utilization of the method of associating a shared I/O endpoint with an OS domain to be within the scope of their invention, as long as the shared I/O endpoint is considered to be within the load-store fabric of the OS domain.

Further, the above discussion has been directed at an embodiment of the present invention within the context of the Ethernet network protocol. This was chosen to illustrate the novelty of the present invention with respect to providing a shareable controller for access to a network. One skilled in the art should appreciate that other network protocols such as Infiniband, OC48/OC192, ATM, SONET, 802.11 are encompassed within the above discussion to allow for sharing controllers for such protocols among multiple processing complexes. Further, Ethernet should be understood as including the general class of IEEE Ethernet protocols, including various wired and wireless media. It is not the specific protocol to which this invention is directed. Rather, it is the sharing of a controller by multiple processing complexes which is of interest. Further, although the term MAC address should be appreciated by one skilled in the art, it should be understood as an address which is used by the Media Access Control sublayer of the Data-Link Layer (DLC) of telecommunication protocols. There is a different MAC sublayer for each physical device type. The other sublayer level in the DLC layer is the Logical Link Control sublayer.

Although the present invention and its objects, features and advantages have been described in detail, other embodiments are encompassed by the invention. In addition to implementations of the invention using hardware, the invention can be implemented in computer readable code (e.g., computer readable program code, data, etc.) embodied in a computer usable (e.g., readable) medium. The computer code causes the enablement of the functions or fabrication or both of the invention disclosed herein. For example, this can be accomplished through the use of general programming languages (e.g., C, C++, JAVA, and the like); GDSII databases; hardware description languages (HDL) including Verilog HDL, VHDL, Altera HDL (AHDL), and so on; or other programming and/or circuit (i.e., schematic) capture tools available in the art. The computer code can be disposed in any known computer usable (e.g., readable) medium including semiconductor memory, magnetic disk, optical disk (e.g., CD-ROM, DVD-ROM, and the like), and as a computer data signal embodied in a computer usable (e.g., readable) transmission medium (e.g., carrier wave or any other medium including digital, optical or analog-based medium). As such, the computer code can be transmitted over communication networks, including Internets and intranets. It is understood that the invention can be embodied in computer code (e.g., as part of an IP (intellectual property) core, such as a microprocessor core, or as a system-level design, such as a System on Chip (SOC)) and transformed to hardware as part of the production of integrated circuits. Also, the invention may be embodied as a combination of hardware and computer code.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

The invention claimed is:

1. A network interface controller (NIC) which provides an interface between a network and a plurality of operating system domains (OSDs), each OSD having a logically distinct load-store domain that uses a common memory map to address both random access memory (RAM) and input-output (I/O) devices, the controller existing within the load-store domain of each of the plurality of OSDs, the controller comprising:
   a bus interface between the plurality of OSDs and the controller, the bus interface enabling each OSD to directly access the controller from within its own logically distinct load-store domain using load-store instructions that address one or more memory-mapped addresses for the shareable NIC that are within the common memory map of the OSD's load-store domain;
   a network interface between the network and the controller; and
   association logic, coupled to both said bus interface and said network interface to associate data coming from the network with at least one of the plurality of operating system domains.

2. The network interface controller as recited in claim 1 wherein the controller comprises a shared Ethernet controller.

3. The network interface controller as recited in claim 1 wherein the network is an Ethernet network.

4. The network interface controller as recited in claim 1 wherein each of the plurality of operating system domains comprise:
   at least one processor;
   a memory coupled to said at least one processor; and
   an operating system executing on said processor.

5. The network interface controller as recited in claim 1 wherein each of the plurality of operating system domains comprise a computer server.

6. The network interface controller as recited in claim 5 wherein said computer server is a blade server.

7. The network interface controller as recited in claim 1 wherein the load-store domain of each of the plurality of operating system domains comprises memory which is accessed by load and store instructions executing within each of the plurality of operating system domains.

8. The network interface controller as recited in claim 1 wherein each of the plurality of operating system domains comprise:
   at least one processor;
   a memory coupled to said at least one processor;
   an operating system executing on said at least one processor;
   a load instruction for loading data from said memory into said at least one processor; and
   a store instruction for storing data from said at least one processor into said memory;
   wherein each of the plurality of operating system domains communicates with the controller using said load instruction and said store instruction.

9. The network interface controller as recited in claim 1 wherein each of the plurality of operating system domains communicates with the network interface controller using a software driver which is loaded into each of the plurality of operating system domains.

10. The network interface controller as recited in claim 9 wherein said software driver is mapped within the load-store domain of each of the plurality of operating system domains.

11. The network interface controller as recited in claim 1 wherein said bus interface comprises:
    an interface to a load-store domain network which transfers data from each of the plurality of operating system domains to the controller; and
    OSD identification logic, which determines for said data received from said load-store domain network, which of the plurality of operating system domains is associated with said data.

12. The network interface controller as recited in claim 11 wherein said load-store domain network comprises PCI-Express+.

13. The network interface controller as recited in claim 12 wherein said PCI-Express+ comprises PCI-Express with OSD header information.

14. The network interface controller as recited in claim 13 wherein said OSD header information comprises a header included with PCI-Express information which identifies which of the plurality of operating system domains is associated with said PCI-Express information.

15. The network interface controller as recited in claim 1 wherein said network interface comprises transmit/receive logic for buffering transmit data to be transmitted to the network, and for buffering receive data received from the network.

16. The network interface controller as recited in claim 15 wherein said transmit/receive logic comprises:
    a virtual fifo for storing said transmit data and said receive data;
    wherein said transmit data is tagged to identify which of the plurality of operating system domains said data came from; and
    wherein said receive data is tagged to identify which of the plurality of operating system domains should receive said receive data.

17. The network interface controller as recited in claim 15 wherein said transmit/receive logic comprises:
    a plurality of transmit fifo's, each corresponding to one of the plurality of operating system domains; and
    a plurality of receive fifo's, each corresponding to one of the plurality of operating system domains.

18. The network interface controller as recited in claim 15 wherein said transmit/receive logic comprises:
- a virtual transmit fifo for storing said transmit data from the plurality of operating system domains; and
- a virtual receive fifo for storing said receive data received from the network.

19. The network interface controller as recited in claim 18 wherein said receive data is tagged with an OSD identifier after it is received from the network into the controller.

20. The network interface controller as recited in claim 19 wherein said OSD identifier designates which of the plurality of operating system domains should receive the data.

21. The network interface controller as recited in claim 19 wherein said OSD identifier is provided by said association logic.

22. The network interface controller as recited in claim 21 wherein said association logic correlates a MAC address within said receive data with a corresponding OSD.

23. The network interface controller as recited in claim 1 wherein said association logic comprises a lookup table which contains a plurality of MAC address which are correlated to a plurality of OSD's.

24. The network interface controller as recited in claim 23 wherein each of said plurality of OSD's is associated with at least one of said plurality of MAC addresses.

25. The network interface controller as recited in claim 23 wherein data received from the network contains a destination MAC address.

26. The network interface controller as recited in claim 25 wherein when said data is received from the network into the controller, said destination MAC address is read from said data, and said lookup table is read to determine an associated OSD for said data.

27. The network interface controller as recited in claim 1 further comprising:
- a non volatile memory for storing a plurality of MAC addresses.

28. The network interface controller as recited in claim 1 further comprising:
- a plurality of direct memory access (DMA) engines; and
- DMA arbitration, coupled to said plurality of DMA engines;
- wherein said plurality of DMA engines are selected by said DMA arbitration to perform data transfer from the plurality of operating system domains to the controller.

29. The network interface controller as recited in claim 1 further comprising:
- a plurality of control status register (CSR) sets; which are to be associated with the plurality of OSD's.

30. The network interface controller as recited in claim 29 wherein said plurality of CSR sets each comprise:
- a head pointer register for storing a head pointer to a location within its associated OSD; and
- a tail pointer register for storing a tail pointer to a location within its associated OSD.

31. The network interface controller as recited in claim 1 further comprising:
- descriptor logic, for storing a plurality of descriptors for the plurality of operating system domains.

32. The network interface controller as recited in claim 31 wherein said descriptor logic comprises:
- a virtual descriptor cache, for storing transmit and receive descriptors for the plurality of operating system domains; and
- tags, coupled to said virtual descriptor cache, for tagging each of said descriptors with their associated one of the plurality of operating system domains.

33. The network interface controller as recited in claim 31 wherein said descriptor logic comprises:
- a virtual transmit descriptor cache for storing transmit descriptors for the plurality of operating system domains; and
- a virtual receive descriptor cache for storing receive descriptors for the plurality of operating system domains.

34. The network interface controller as recited in claim 31 wherein said descriptor logic comprises:
- a plurality of transmit descriptor caches, each of said caches associated with one of the plurality of operating system domains; and
- a plurality of receive descriptor caches, each of said caches associated with one of the plurality of operating system domains;
- wherein transmit descriptors are stored in said plurality of transmit descriptor caches; and
- wherein receive descriptors are stored in said plurality of receive descriptor caches.

35. A shareable network interface controller (NIC) for a computing device having a plurality of operating system domains (OSDs), each OSD having a logically distinct load-store domain that uses a common memory map to address both random access memory (RAM) and input-output (I/O) devices, the shareable NIC comprising:
- transmit/receive logic for coupling the controller to a network to transmit/receive network communication;
- bus interface and operating system domain identification logic, for interfacing the controller to the plurality of operating system domains (OSD's), and for associating OSD communication to and from said bus interface with ones of the plurality of OSD's;
- the bus interface enabling each OSD to directly access the shareable NIC from within its own logically distinct load-store domain using load-store instructions that address one or more memory-mapped addresses for the shareable NIC that are within the common memory map of the OSD's load-store domain;
- association logic, coupled to said transmit/receive logic, for associating said network communication with ones of the plurality of OSD's;
- wherein by associating said network communication with ones of the plurality of OSD's, and associating said OSD communication with ones of the plurality of OSD's, the shared controller provides communication between the plurality of OSD's and said network.

36. The shareable network interface controller as recited in claim 35 wherein the shareable network interface controller is a shareable Ethernet controller.

37. The shareable network interface controller as recited in claim 36 wherein said shareable Ethernet controller supports 10/100 megabit, 1 gigabit, and/or 10 gigabit network communication.

38. The shareable network interface controller as recited in claim 35 further comprising resources directly accessible by the plurality of OSD's using load and/or store instructions.

39. The shareable network interface controller as recited in claim 38 wherein said resources comprise memory spaces for each of the plurality of OSD's.

40. The shareable network interface controller as recited in claim 35 wherein each of the plurality of OSD's is unaware that it is sharing the shareable network interface controller with another one of the plurality of OSD's.

41. The shareable network interface controller as recited in claim 35 wherein each of the plurality of OSD's comprise:
   a processing complex; and
   memory, coupled to said processing complex.

42. The shareable network interface controller as recited in claim 41 wherein said processing complex comprises at least one processor.

43. The shareable network interface controller as recited in claim 35 wherein said transmit/receive logic stores said network communication from/to at least two of the plurality of OSD's, simultaneously.

44. The shareable network interface controller as recited in claim 35 wherein said transmit/receive logic comprises:
   a transmit fifo for storing said network communication to be transmitted to said network; and
   a receive fifo, for storing network communication received from said network.

45. The shareable network interface controller as recited in claim 44 wherein said transmit fifo comprises a virtual fifo for storing said network communication from a plurality of OSD's, simultaneously.

46. The shareable network interface controller as recited in claim 44 wherein said receive fifo comprises a virtual fifo for storing said network communication destined for a plurality of OSD's, simultaneously.

47. The shareable network interface controller as recited in claim 44 wherein said transmit fifo and said receive fifo each further comprise:
   OSD management logic, for associating data within each of said fifo's with corresponding OSD's.

48. The shareable network interface controller as recited in claim 35 wherein said transmit/receive logic comprises:
   a virtual fifo for storing both said network communication to be transmitted to said network, and said network communication received from said network, simultaneously.

49. The shareable network interface controller as recited in claim 48 wherein simultaneously indicates that transmit network communication and receive network communication coexists within said virtual fifo.

50. The shareable network interface controller as recited in claim 48 wherein said virtual fifo further comprises OSD management logic, for associating data within said virtual fifo with corresponding OSD's.

51. The shareable network interface controller as recited in claim 35 wherein said transmit/receive logic comprises:
   a plurality of transmit fifo's, one for each of the plurality of OSD's; and
   a plurality of receive fifo's, one for each of the plurality of OSD's.

52. The shareable network interface controller as recited in claim 35 wherein said network is an Ethernet network.

53. The shareable network interface controller as recited in claim 35 wherein said network is a packet based network.

54. The shareable network interface controller as recited in claim 35 wherein said network communication comprises packet based communication.

55. The shareable network interface controller as recited in claim 35 wherein said bus interface and operating system domain identification logic comprises:
   a bus interface to a load-store architecture bus; and
   operating system domain identification logic, coupled to said bus interface.

56. The shareable network interface controller as recited in claim 55 wherein said load-store architecture bus comprises a packet based serial communication bus.

57. The shareable network interface controller as recited in claim 55 wherein said load-store architecture bus comprises a PCI-Express+bus.

58. The shareable network interface controller as recited in claim 57 wherein said PCI-Express+bus comprises a PCI-Express bus which includes an OSD header.

59. The shareable network interface controller as recited in claim 58 wherein said OSD header identifies an associated OSD for packets transmitted over said PCI-Express bus.

60. The shareable network interface controller as recited in claim 58 wherein said operating system domain identification logic examines said OSD header for packets received by said bus interface to determine which of the plurality of OSD's transmitted said packets, and places said OSD header into packets to be transmitted by said bus interface to identify which of the plurality of OSD's said transmitted packets are for.

61. The shareable network interface controller as recited in claim 35 wherein said association logic comprises:
   a look up table for storing OSD and MAC address associations.

62. The shareable network interface controller as recited in claim 61 wherein said look up table comprises:
   a plurality of OSD entries; and
   a plurality of MAC address entries;
   wherein each of said plurality of OSD entries is associated with at least one of said plurality of MAC address entries.

63. The shareable network interface controller as recited in claim 62 wherein each of said OSD entries comprise a bit representation for identifying an upstream operating system domain.

64. The shareable network interface controller as recited in claim 63 wherein said bit representation comprises 3-bits for designating eight distinct operating system domains.

65. The shareable network interface controller as recited in claim 63 wherein said bit representation comprises 8-bits for designating eight or more distinct operating system domains.

66. The shareable network interface controller as recited in claim 62 wherein each of said plurality of MAC address entries comprise a unique machine address.

67. The shareable network interface controller as recited in claim 62 wherein by associating a MAC address entry with an OSD entry, the controller can associate said network communication with ones of said plurality of OSD entries based on a destination MAC address within said network communication.

68. The shareable network interface controller as recited in claim 62 wherein by associating a MAC address entry with an OSD entry, the controller can associate said OSD communication with ones of said plurality of MAC address entries.

69. The shareable network interface controller as recited in claim 35 further comprising:
   a plurality of control status register sets (CSR's), coupled to said bus interface and operating system domain identification logic, each available to be associated with a unique one of the plurality of operating system domains.

70. The shareable network interface controller as recited in claim 69 wherein each of said plurality of control register sets comprise:
   a head pointer register, for storing a head pointer associated with a descriptor block in a memory associated with one of the plurality of OSD's; and
   a tail pointer register, for storing a tail pointer associated with said descriptor block in said memory associated with said one of the plurality of OSD's.

71. The shareable network interface controller as recited in claim 69 wherein each of the plurality of operating system domains must be associated with a different one of said plurality of control status register sets.

72. The shareable network interface controller as recited in claim 69 wherein unique one of the plurality of operating system domains implies that each of said plurality of control status register sets is associated with no more than one of the plurality of operating system domains.

73. The shareable network interface controller as recited in claim 35 further comprising:
a descriptor cache, coupled to said bus interface and operating system domain identification logic, for storing descriptors retrieved from the plurality of operating system domains.

74. The shareable network interface controller as recited in claim 73 wherein said descriptors define memory locations within memories of the plurality of operating system domains where said OSD communication is transferred to/from the controller.

75. The shareable network interface controller as recited in claim 73 wherein said descriptor cache comprises:
a plurality of descriptor caches, each available to be associated with one of the plurality of operating system domains; and
descriptor arbitration logic, coupled to said plurality of descriptor caches, for associating each of the plurality of descriptor caches with each of the plurality of operating system domains.

76. The shareable network interface controller as recited in claim 73 wherein said descriptor cache comprises:
a virtual descriptor cache, for storing descriptors from the plurality of operating system domains; and
tag logic, coupled to the virtual descriptor cache, for associating each of said descriptors with their associated one of the plurality of operating system domains.

77. The shareable network interface controller as recited in claim 76 wherein said virtual descriptor cache further comprises:
a virtual transmit descriptor cache for storing descriptors for said OSD communication to be transmitted as said network communication; and
a virtual receive descriptor cache for storing descriptors for said network communication to be received as said OSD communication.

78. The shareable network interface controller as recited in claim 35 further comprising:
a plurality of direct memory access (DMA) engines, said engines used by the controller to DMA said OSD communication from the plurality of OSD's, and to DMA said network communication to the plurality of OSD's.

79. The shareable network interface controller as recited in claim 78 wherein said plurality of DMA engines further comprise:
DMA arbitration, coupled to said plurality of DMA engines, for arbitrating selection of said plurality of DMA engines among the plurality of OSD's.

80. The shareable network interface controller as recited in claim 35 further comprising:
packet replication logic, coupled to said bus interface and operating system domain identification logic, for restoring said OSD communication into said transmit/receive logic for multicast or broadcast communication.

81. The shareable network interface controller as recited in claim 80 wherein said multicast or broadcast communication comprises communication from one of the plurality of OSD's to more than one destination MAC address on said network.

82. The shareable network interface controller as recited in claim 80 wherein said packet replication logic places said OSD communication within a receive portion of said transmit/receive logic when a loopback communication occurs.

83. The shareable network interface controller as recited in claim 82 wherein said loopback communication occurs when a destination MAC address for said OSD communication corresponds to a MAC address within said association logic.

* * * * *